US011364852B2

(12) United States Patent
Robillard et al.

(10) Patent No.: US 11,364,852 B2
(45) Date of Patent: Jun. 21, 2022

(54) STORAGE BOX ASSEMBLY FOR A VEHICLE

(71) Applicant: BOMBARDIER RECREATIONAL PRODUCTS INC., Valcourt (CA)

(72) Inventors: Pierre-Luc Robillard, Sherbrooke (CA); Michel Bourassa, Sherbrooke (CA); Bart Vandenbogaard, Racine (CA); Stefan Djerkic, Montreal (CA); Louis-Rene Sauve, Magog (CA); Philippe Rousseau, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 16/792,687

(22) Filed: Feb. 17, 2020

(65) Prior Publication Data

US 2020/0331405 A1     Oct. 22, 2020

Related U.S. Application Data

(60) Provisional application No. 62/835,229, filed on Apr. 17, 2019.

(51) Int. Cl.
*B60R 9/06* (2006.01)
(52) U.S. Cl.
CPC .................................. *B60R 9/065* (2013.01)
(58) Field of Classification Search
CPC ............ B60R 9/00; B60R 9/065; B60R 11/06
See application file for complete search history.

(56) References Cited

U.S. PATENT DOCUMENTS

| 3,874,574 | A | * | 4/1975 | Heise | ......................... | B62J 9/00 |
|---|---|---|---|---|---|---|
| | | | | | | 224/417 |
| D243,392 | S | | 2/1977 | Fairthorne | | |
| 4,125,213 | A | * | 11/1978 | Watkins | ..................... | B62J 9/00 |
| | | | | | | 224/413 |
| D258,650 | S | | 3/1981 | Beaubien et al. | | |

(Continued)

FOREIGN PATENT DOCUMENTS

EM     000191572-0001 S     9/2004

OTHER PUBLICATIONS

Grant Decision issued from the ROSPATENT on Sep. 4, 2020 in connection with the corresponding application No. 2020500053.

(Continued)

*Primary Examiner* — Justin M Larson
(74) *Attorney, Agent, or Firm* — BCF LLP

(57) ABSTRACT

A storage box assembly for a vehicle includes a box having an upper portion having a first bottom wall and first side walls, the first bottom wall having an inner periphery and an outer periphery. The box further has a lower portion having a second bottom wall and second side walls. A first interior volume of the upper portion communicates with a second interior volume of the lower portion. The storage box assembly further includes at least one anchor mounted to the box for selectively securing the storage box assembly to the vehicle. The at least one anchor is disposed within the outer periphery of the first bottom wall, and has a bottom surface being vertically spaced from a lower surface of the second bottom wall and being disposed between the upper end of the first side walls and the second bottom wall.

23 Claims, 24 Drawing Sheets

(56) References Cited

U.S. PATENT DOCUMENTS

| | | | |
|---|---|---|---|
| 4,274,568 A * | 6/1981 | Bott | B60R 9/065 |
| | | | 220/629 |
| D259,780 S | 7/1981 | Davidson | |
| 4,325,531 A * | 4/1982 | Omholt | B62J 9/00 |
| | | | 248/553 |
| 4,588,114 A | 5/1986 | Lebaron et al. | |
| D287,237 S | 12/1986 | Abe | |
| D297,134 S | 8/1988 | Levine | |
| 4,967,944 A * | 11/1990 | Waters | B60R 9/00 |
| | | | 224/404 |
| 5,038,983 A * | 8/1991 | Tomososki | B60R 9/065 |
| | | | 224/521 |
| D343,603 S | 1/1994 | Kamata | |
| D343,815 S | 2/1994 | Kamata | |
| D346,144 S | 4/1994 | Katz | |
| 5,947,356 A * | 9/1999 | Delong | B60R 9/00 |
| | | | 224/404 |
| D420,321 S | 2/2000 | McCoy et al. | |
| D462,933 S | 9/2002 | Itakura | |
| 6,464,277 B2 * | 10/2002 | Wilding | B60R 9/00 |
| | | | 224/404 |
| 6,607,327 B1 * | 8/2003 | Ho | B62J 7/08 |
| | | | 24/334 |
| D480,680 S | 10/2003 | Yonai et al. | |
| 6,729,514 B1 * | 5/2004 | Delgado | B60R 9/00 |
| | | | 224/404 |
| 6,786,374 B2 * | 9/2004 | Schlecht | B60R 5/04 |
| | | | 224/544 |
| D513,602 S | 1/2006 | Lynch | |
| D597,019 S * | 7/2009 | Zarza | D12/414.1 |
| 7,775,411 B2 * | 8/2010 | Campbell | B62J 9/00 |
| | | | 224/431 |
| D626,062 S * | 10/2010 | Giddens | D12/414.1 |
| D630,156 S | 1/2011 | Farber | |
| D638,778 S * | 5/2011 | Giddens | D12/414 |
| D656,081 S | 3/2012 | Yonai et al. | |
| 8,225,972 B2 * | 7/2012 | Butkiewicz | B62J 7/04 |
| | | | 224/413 |
| D670,230 S | 11/2012 | Kataoka | |
| 8,646,668 B2 * | 2/2014 | Oakes | B60R 9/065 |
| | | | 224/401 |
| 8,757,457 B2 * | 6/2014 | Settelmayer | B60R 9/055 |
| | | | 224/328 |
| 8,777,531 B2 * | 7/2014 | Massicotte | B60P 7/08 |
| | | | 410/82 |
| 8,820,598 B2 * | 9/2014 | Tennyson | B60R 9/065 |
| | | | 224/509 |
| 8,875,830 B2 | 11/2014 | Massicotte et al. | |
| 9,045,187 B2 | 6/2015 | Komatsu et al. | |
| 9,566,915 B1 * | 2/2017 | Singer | B62D 33/023 |
| 9,623,927 B2 | 4/2017 | Rehschuh | |
| 9,643,543 B1 * | 5/2017 | Race | B60R 9/065 |
| 9,751,592 B2 * | 9/2017 | Labbe | B60R 9/06 |
| 9,821,870 B2 | 11/2017 | Kitayama et al. | |
| 9,975,496 B2 * | 5/2018 | Adler | B60R 9/10 |
| 10,391,949 B2 * | 8/2019 | Labbe | B60R 9/065 |
| D863,203 S | 10/2019 | Eriksson et al. | |
| 10,450,025 B2 * | 10/2019 | Linden | B62J 7/04 |
| 10,596,975 B1 * | 3/2020 | Quintus | F16C 11/045 |
| 10,676,043 B2 * | 6/2020 | Klatt | B60R 11/00 |
| 10,744,953 B2 * | 8/2020 | Labbe | B60R 9/065 |
| 10,787,216 B2 * | 9/2020 | Visenzi | B62J 9/26 |
| 10,814,794 B1 * | 10/2020 | Jadhav | B60R 9/065 |
| 10,850,806 B2 * | 12/2020 | Labbe | B60R 9/06 |
| 10,875,462 B2 * | 12/2020 | Chapdelaine | B60R 9/065 |
| D911,254 S * | 2/2021 | Bourassa | D12/413 |
| D911,255 S * | 2/2021 | Dumont | D12/413 |
| D911,914 S * | 3/2021 | Dumont | D12/413 |
| 2005/0017038 A1 * | 1/2005 | Johnson | B60R 11/06 |
| | | | 224/404 |
| 2005/0123379 A1 * | 6/2005 | Barina | F16B 21/02 |
| | | | 411/508 |
| 2006/0162978 A1 | 7/2006 | Thompson et al. | |
| 2006/0186159 A1 * | 8/2006 | Lawrence | B62J 7/04 |
| | | | 224/422 |
| 2006/0261111 A1 * | 11/2006 | McCoy | B60R 9/065 |
| | | | 224/499 |
| 2006/0266777 A1 * | 11/2006 | Huang | B60R 9/055 |
| | | | 224/401 |
| 2009/0159627 A1 * | 6/2009 | Myrex | B60R 9/065 |
| | | | 224/495 |
| 2009/0272754 A1 * | 11/2009 | Timmer | B60R 11/06 |
| | | | 220/810 |
| 2010/0243691 A1 | 9/2010 | Salisbury | |
| 2010/0320245 A1 * | 12/2010 | Vilkomirski | B25H 3/02 |
| | | | 224/404 |
| 2016/0009232 A1 * | 1/2016 | Budny | B25H 3/02 |
| | | | 206/373 |
| 2017/0174145 A1 | 6/2017 | Labbe et al. | |
| 2018/0051735 A1 * | 2/2018 | Stenyakin | F16B 5/10 |
| 2018/0327041 A1 | 11/2018 | Moroni et al. | |
| 2018/0340356 A1 * | 11/2018 | Brennan | E05B 73/00 |
| 2019/0039781 A1 * | 2/2019 | Kogel | B65D 21/0209 |
| 2020/0331405 A1 * | 10/2020 | Robillard | B60R 9/065 |
| 2020/0339040 A1 * | 10/2020 | Labbe | B62M 27/02 |
| 2020/0406730 A1 * | 12/2020 | Fournier | B60J 7/198 |

OTHER PUBLICATIONS

Notice of Allowance dated Oct. 27, 2020 from the USPTO in connection with the U.S. Appl. No. 29/698,370 and PTO-892 Form.

\* cited by examiner

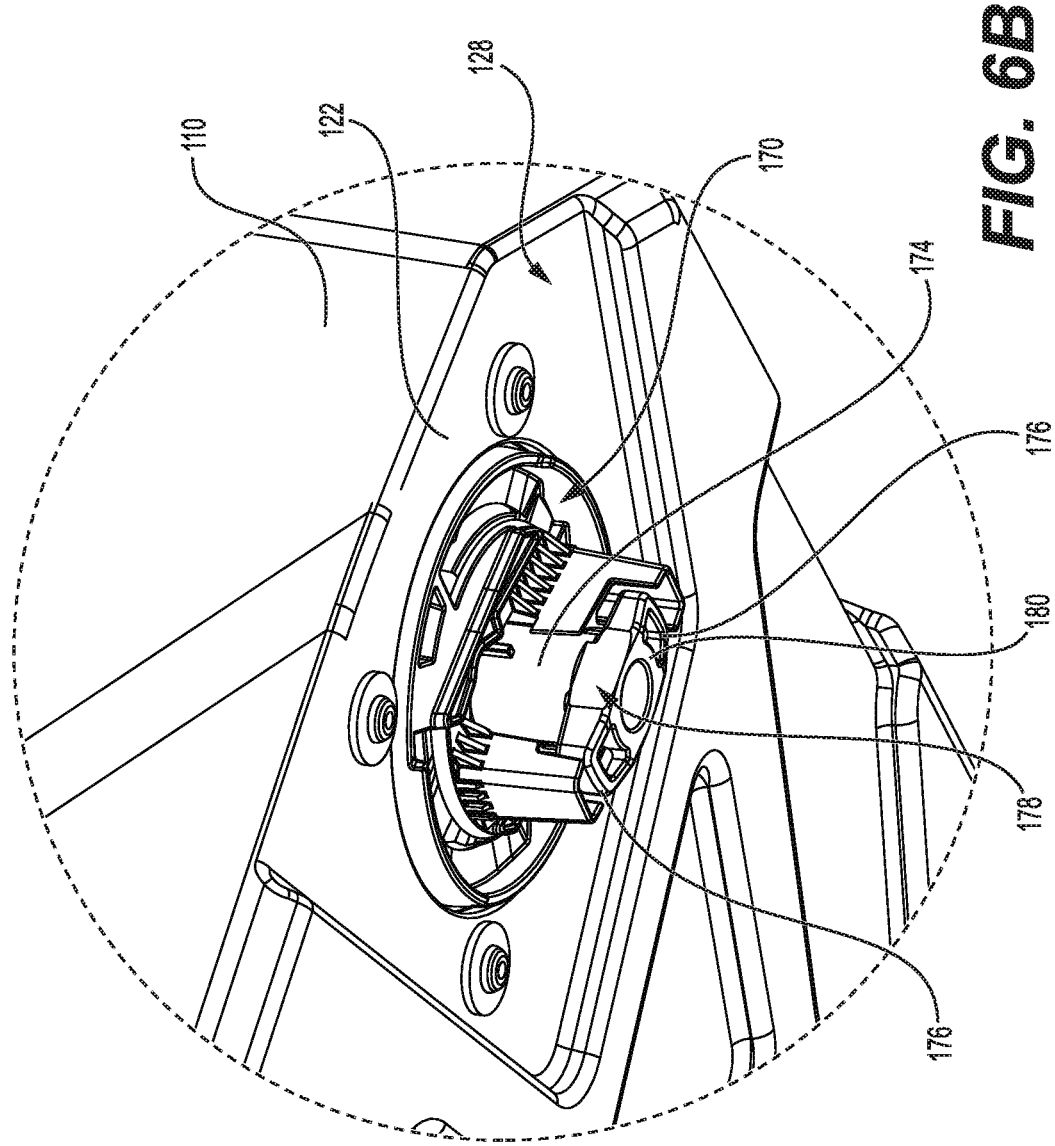

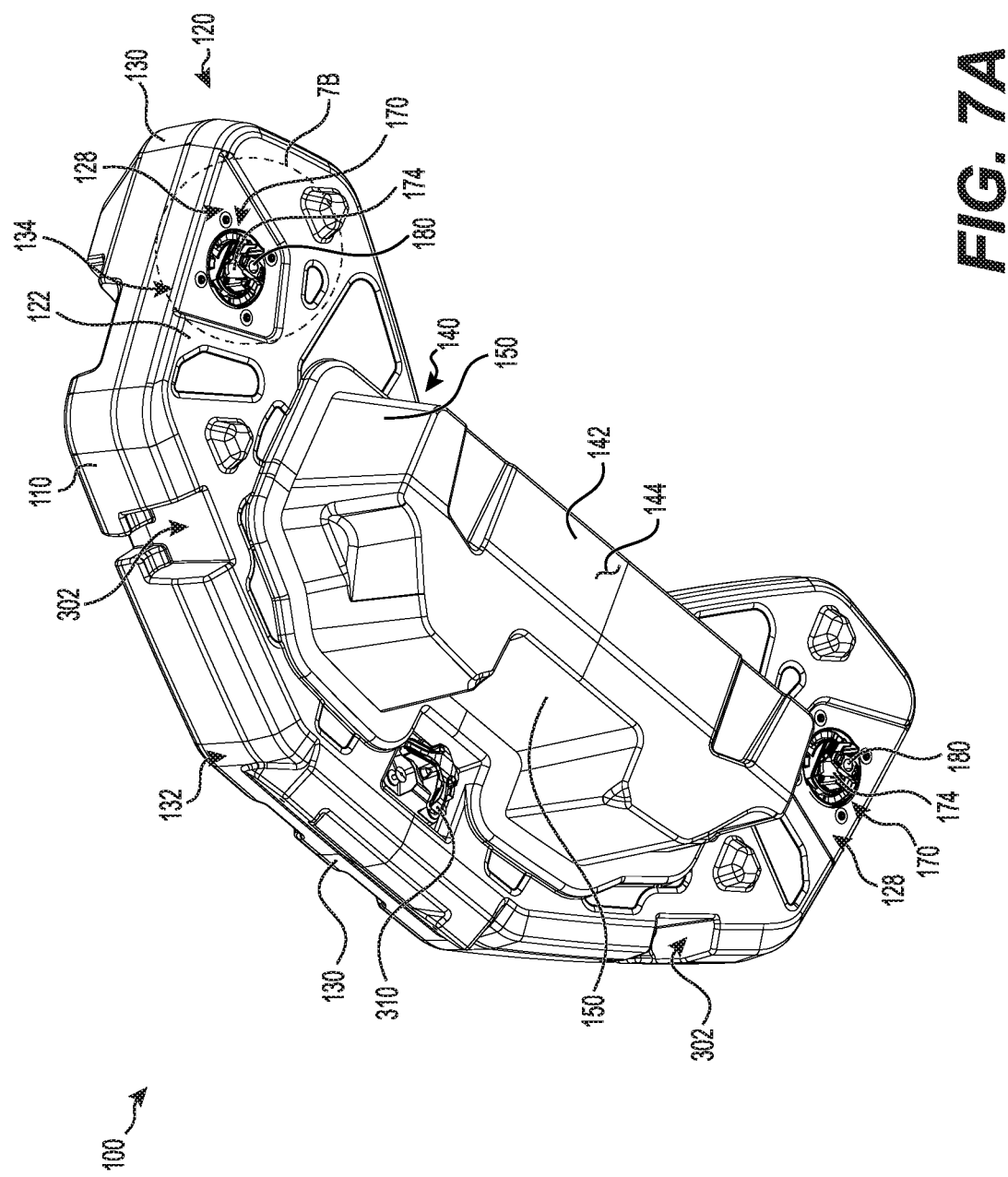

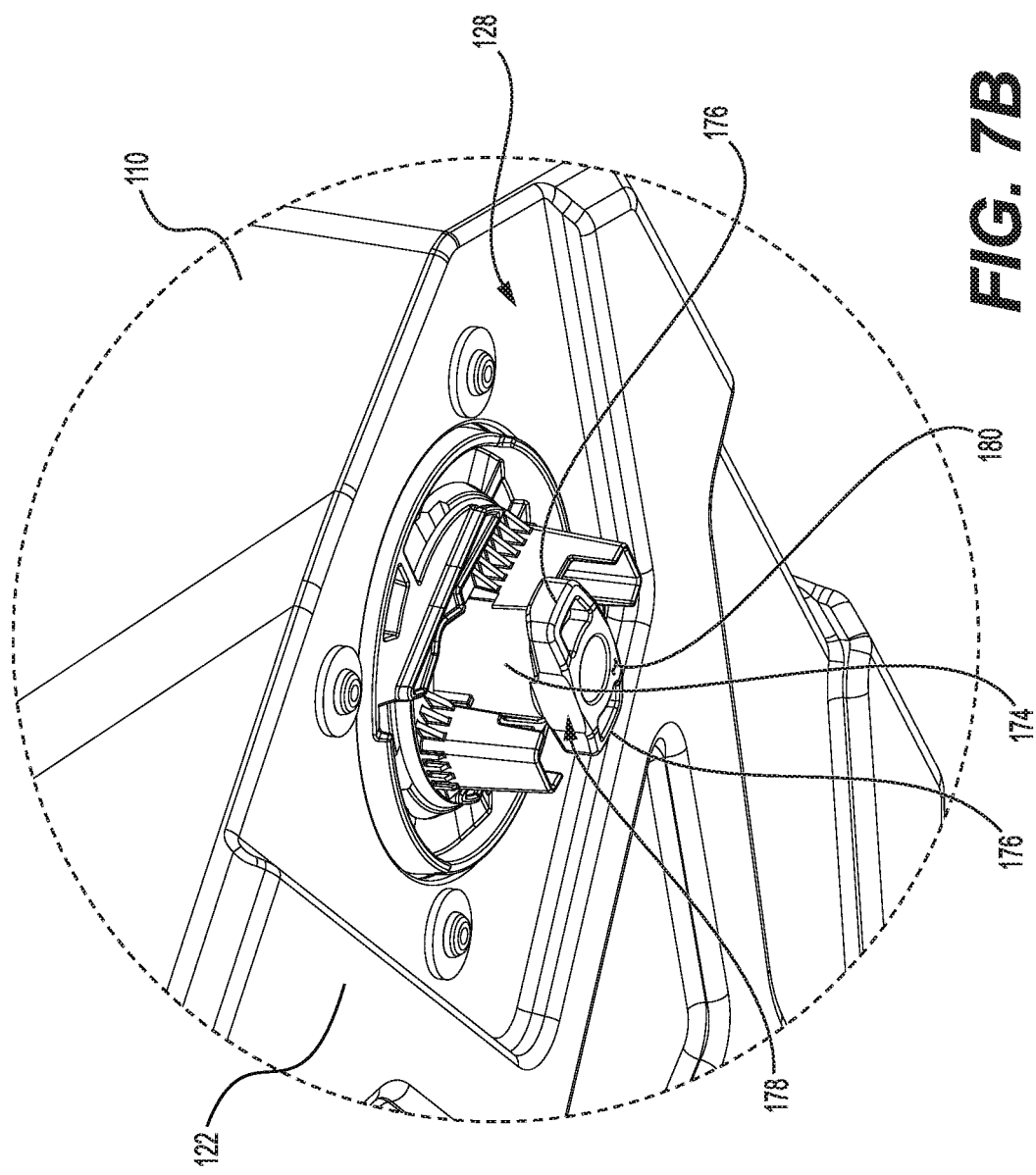

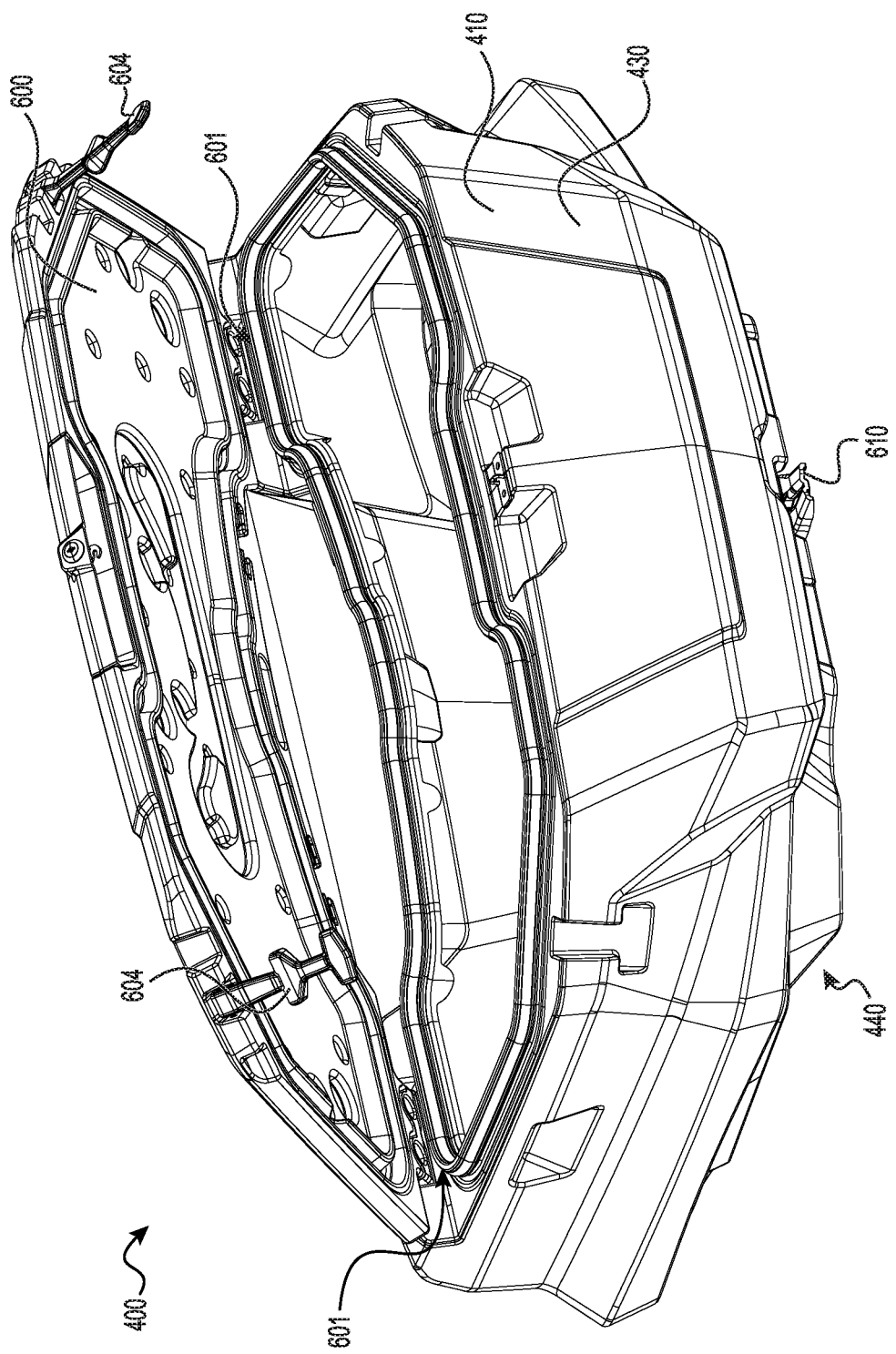

STORAGE BOX ASSEMBLY FOR A VEHICLE

CROSS-REFERENCE TO RELATED APPLICATION

The present application claims priority to U.S. Provisional Patent Application Ser. No. 62/835,229, filed Apr. 17, 2019, entitled "Storage Box Assembly For A Vehicle", which is incorporated by reference herein in its entirety.

TECHNOLOGICAL FIELD

The present technology relates to storage box assemblies for vehicles.

BACKGROUND

Recreational vehicles such as personal watercrafts (PWCs), all-terrain vehicles (ATVs), side-by-side off-road vehicles (SSVs), snowmobiles and the like are used for both utility and recreational purposes. As such, these may be used for transporting cargo and accessories needed for such purposes. It is thus desirable to have storage boxes mounted to the recreational vehicle to carry such cargo and accessories.

Therefore, there is a desire for storage boxes for recreational vehicles that permit different accessories and cargo to be carried while the recreational vehicle is being operated.

SUMMARY

It is an object of the present technology to ameliorate at least some of the inconveniences present in the prior art.

In one aspect, the present technology provides a storage box assembly for a vehicle including a box. The box includes an upper portion having a first bottom wall and first side walls. The first bottom wall has an inner periphery and an outer periphery. The first side walls have upper and lower ends. The first side walls extend from the outer periphery of the first bottom wall above the first bottom wall. The box also includes a lower portion having a second bottom wall and second side walls. The second side walls have upper and lower ends. The second side walls extend at least in part from the inner periphery of the first bottom wall below the first bottom wall. A first interior volume of the upper portion communicates with a second interior volume of the lower portion. The storage box assembly further includes at least one anchor mounted to the box for selectively securing the storage box assembly to the vehicle. The at least one anchor is disposed within the outer periphery of the first bottom wall. The at least one anchor has a bottom surface being vertically spaced from a lower surface of the second bottom wall and being disposed between the upper end of the first side walls and the second bottom wall.

In some implementations, the first side walls define a first outer periphery of the box at the lower end of the first side walls, the second side walls define a second outer periphery of the box at the upper end of the second side walls, and the second outer periphery is disposed at least in part within the first outer periphery.

In some implementations, the first bottom wall is adapted for abutting a top surface of a receptacle provided on the vehicle for supporting the storage box assembly on the vehicle.

In some implementations, the at least one anchor includes a latch defining the bottom surface of the at least one anchor, and the latch is receivable in an aperture defined in the vehicle.

In some implementations, the lower portion defines at least one recess in the second bottom wall, the at least one recess extending upwardly towards the upper portion of the box, and the at least one anchor is disposed at least in part within the at least one recess.

In some implementations, the at least one anchor is disposed between the inner and outer peripheries of the first bottom wall.

In some implementations, the upper portion defines at least one recess in the first bottom wall. The at least one recess extends upwardly towards the upper end of the first side walls. The at least one anchor is disposed at least in part within the at least one recess.

In some implementations, the at least one anchor is a manually-operable anchor.

In some implementations, the at least one anchor is operable from inside the box.

In some implementations, the at least one anchor is a first anchor and a second anchor, and the first and second anchors are disposed on opposite sides of a longitudinal center plane of the box.

In some implementations, the storage box assembly further includes a tongue connected to the lower portion of the box, the tongue projecting outwardly of an outer side of the second side walls.

In some implementations, a maximum height of the second side walls is greater than a maximum height of the first side walls.

In some implementations, a maximum width between the upper ends of laterally opposite first side walls is greater than a maximum width between the lower ends of laterally opposite second side walls.

In some implementations, a maximum length between the upper ends of longitudinally opposite first side walls is greater than a maximum length between the lower ends of longitudinally opposite second side walls.

In some implementations, the first interior volume of the upper portion is greater than the second interior volume of the lower portion.

In some implementations, the first side walls define an accessory holder on an outer side thereof for receiving an accessory, the accessory holder being accessible from outside the box.

In some implementations, the storage box assembly further includes a panel removably connected to the first side walls, the panel covering at least partially the accessory holder for securing the accessory when received in the accessory holder.

In some implementations, the storage box assembly further includes at least one securing device connected to the first side walls for selectively securing the accessory when received in the accessory holder.

In some implementations, the storage box assembly further includes a lid connected to the upper portion of the box for selectively preventing access to the first and second interior volumes of the upper and lower portions.

In some implementations, the lid is removably connected to the box.

In some implementations, the lid has outer edge portions, at least one slot is defined in the outer edge portions, and at least one rod extends through the at least one slot, the at least one rod being structured for securing an item to the lid.

In accordance with another aspect of the present technology, there is provided a vehicle including a frame, a motor connected to the frame, a steering assembly connected to the frame, the steering assembly including a steering input device, and the storage box assembly described above.

In some implementations, the storage box assembly is disposed forward of the steering input device.

In some implementations, the vehicle defines a receptacle disposed forward of the steering input device for supporting the storage box assembly, and the storage box assembly is received at least partially in the receptacle.

In some implementations, the storage box assembly is disposed rearward of the steering input device.

In some implementations, a portion of the frame defines an opening for receiving the storage box assembly at least in part therein. The upper portion of the box extends above the portion of the frame defining the opening. The lower portion extends through the portion of the frame defining the opening.

In some implementations, the vehicle defines an aperture, and a latch of the at least one anchor is received in the aperture.

For purposes of the present application, terms related to spatial orientation when referring to a vehicle and components in relation to the vehicle, such as "forwardly", "rearwardly", "left", "right", "top", "bottom", "upper", "lower", "above" and "below", are as they would be understood by a driver of the vehicle sitting thereon in an upright driving position, with the vehicle steered straight-ahead.

Should there be any discrepancies in the definitions of terms in this application and the definition of these terms in any document included herein by reference, the definition of such terms as defined in the present application take precedence.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 6B is an enlarged view of portion 6B of FIG. 6A;

FIG. 7A is a perspective view taken from a bottom, front, left side of the front storage box assembly of FIG. 4, with the left anchor in a locked position;

FIG. 7B is an enlarged view of portion 7B of FIG. 7A;

FIG. 16B is a perspective view taken from a top, rear, left side of the rear storage box assembly of FIG. 13, with the lid of the rear storage box assembly in an open position;

DETAILED DESCRIPTION

Figure 1:
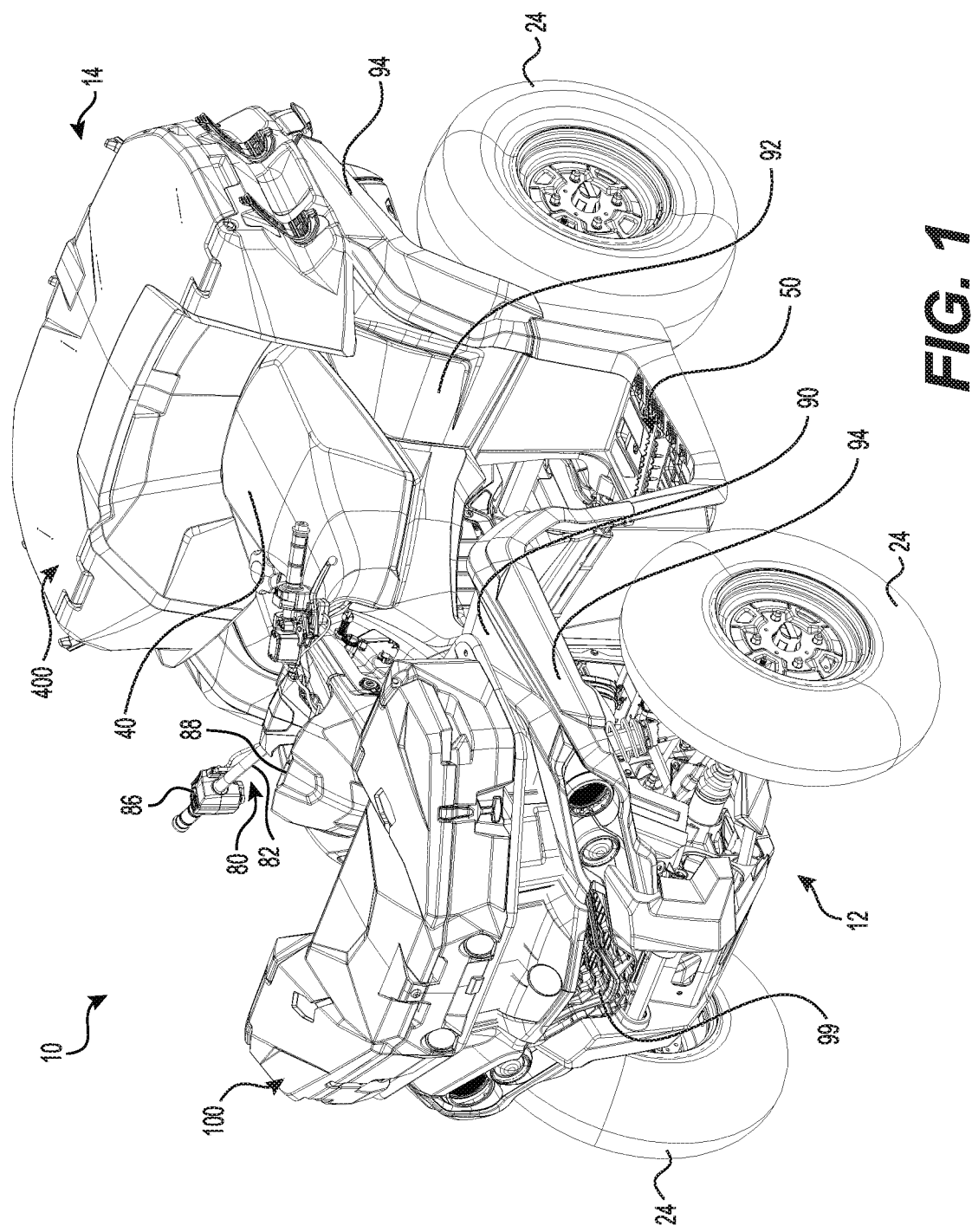
FIG. 1 is a perspective view taken from a top, front, left side of a straddle-seat all-terrain vehicle (ATV), with front and rear storage box assemblies secured thereto.

In the following description, various implementations of a storage box assembly for a vehicle will be described. A front storage box assembly 100 for a straddle-seat all-terrain vehicle 10 (hereinafter ATV) will be described with reference to FIGS. 1 to 13. A rear storage box assembly 400 for the ATV 10 will be described with reference to FIGS. 1 to 3 and 12 to 16B. Another rear storage box assembly 800 structured and arranged to be disposed at the rear of a snowmobile 1000 will be described with reference to FIGS. 17 to 21. It is contemplated that aspects of the storage box assemblies 100, 400, 800 of the present technology could be used in other types of vehicles, such as three-wheeled vehicles, personal watercraft (PWCs), side-by-side off-road vehicles (SSVs), motorcycles, and the like.

Figure 2:
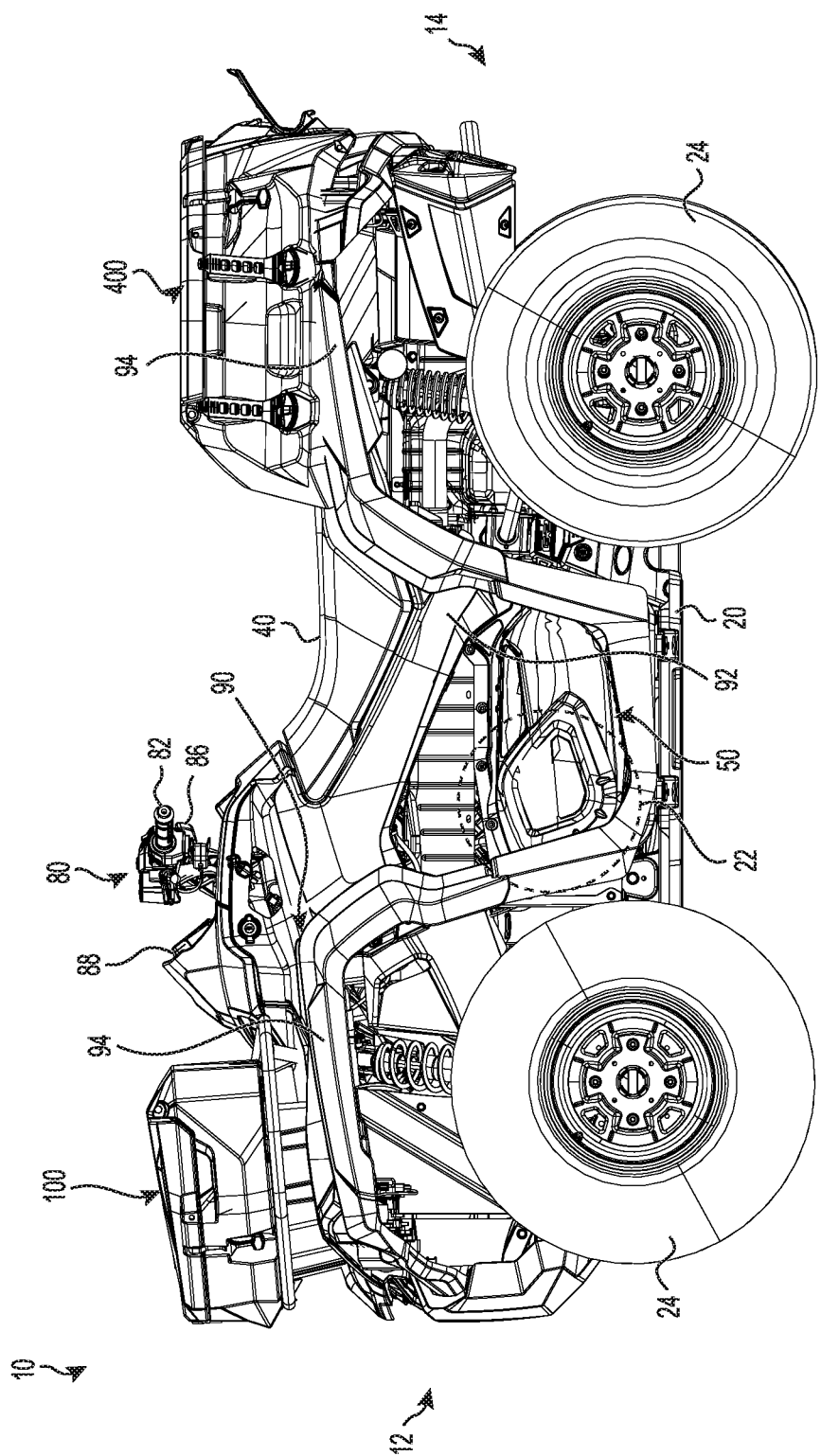
FIG. 2 is a left side elevation view of the vehicle of FIG. 1.
Figure 3:
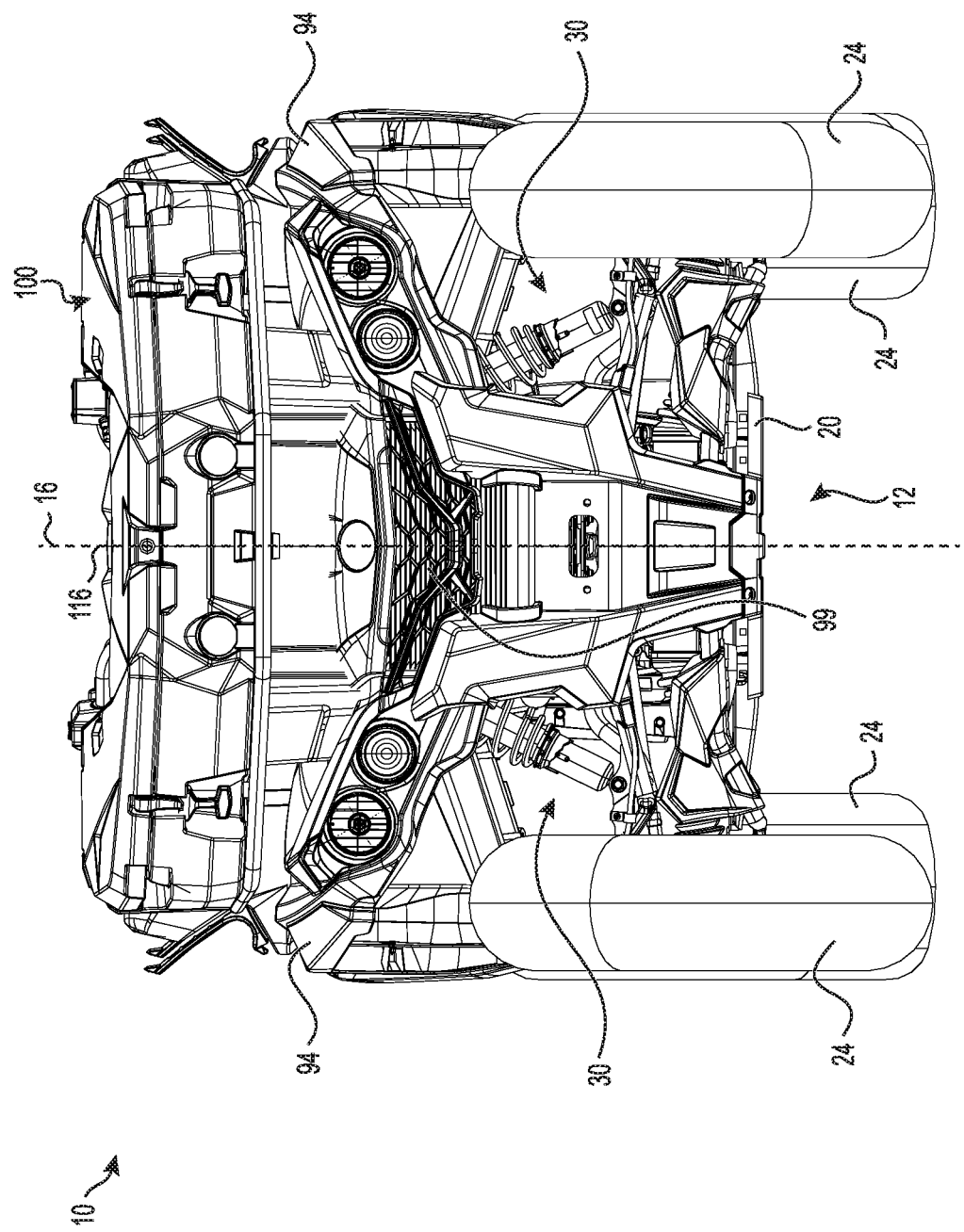
FIG. 3 is a front elevation view of the vehicle of FIG. 1.

Before describing the storage box assemblies 100, 400, 800 in details, the ATV 10 will be generally described. Referring to FIGS. 1 to 3, the ATV 10 has a front end 12 and a rear end 14 defined consistently with a forward travel direction of the ATV 10. A longitudinal center plane 16 (FIG. 3) extends vertically and longitudinally through the lateral center of the ATV 10. The ATV 10 has a frame 20. As best seen in FIGS. 8 to 11, the frame 20 has a portion 20a defining an opening 20b for receiving the front storage box assembly 100 at least in part therein. More details related to the disposition and securing of the front storage box assembly 100 on the ATV 10 will be provided below. The portion 20a of the frame 20 is formed by tubular members 20c and planar members 20d of the frame 20.

Referring back to FIGS. 1 to 3, a motor 22 (schematically shown in FIG. 2) is connected to the frame 20 for powering the ATV 10. The ATV 10 has two front wheels 24 and two rear wheels 24. The wheels 24 are operatively connected to the motor 22 via a transmission (not shown). In the present implementation, the motor 22 is an internal combustion engine and the transmission is a continuously variable transmission, but other types of motors and transmissions are contemplated. Each of the four wheels 24 is provided with low-pressure balloon tires adapted for off-road conditions and traversing rugged terrain. It is contemplated that other implementations of the ATV 10 could have only three wheels 24. The two front wheels 24 are suspended from the frame 20 by left and right front suspension assemblies 30 (FIG. 3) while the two rear wheels 24 are suspended from the frame 20 by left and right rear suspension assemblies (not shown).

Still referring to FIGS. 1 to 3, the ATV 10 further includes a straddle seat 40 connected to the frame 20 for accommodating a driver of the ATV 10. Driver footrests 50 are provided on either side of the driver seat 40 and are disposed vertically lower than the driver seat 40 to support the driver's feet. A steering assembly 80 is rotationally connected the frame 20 to enable a driver to steer the ATV 10. The steering assembly 80 includes a handlebar 82 connected to a steering column assembly 84 for actuating steering linkages operatively connected to the left and right front wheels 24. Other steering input devices, such as a steering wheel, could be used in different vehicles.

A throttle operator 86 (FIGS. 1 and 2), in the form of a thumb-actuated throttle lever, is mounted to the handlebar 82. Other types of throttle operators, such as a finger-actuated throttle lever and a twist grip, are also contemplated. A gear shifter (not shown) located near the handlebar 82 is connected to the transmission and enables a driver to select one of a plurality of gear configurations for operation of the ATV 10. In the illustrated implementation of the ATV 10, the gear configurations include park, neutral, reverse, low, and drive. It is contemplated that the sequence and/or number of gear configurations could be different than as shown herein. A display cluster 88, including a number of gauges and buttons, is disposed forwardly of the steering assembly 80.

The ATV 10 also has cowlings 90 including several side panels 92 extending over the lateral sides of the ATV 10, and fenders 94 disposed over each of the wheels 24. As best seen in FIGS. 8 to 11, a front receptacle 96a is provided on the ATV 10 for supporting the front storage box assembly 100. The front receptacle 96a is formed by the opening 20b of the portion 20a of the frame 20, and by a top surface 96b defined by the planar members 20d of the portion 20a of the frame 20. The receptacle 96a is disposed rearward of a front grille 99 (FIG. 3) and the cowlings 90 forming the front fascia of the ATV 10. When the font storage box assembly 100 is received at least in part in the front receptacle 96a, the front storage box assembly 100 is disposed forwardly of the handlebar 82 of the ATV 10. Still referring to FIGS. 8 to 11, a rear receptacle 97a is provided on the ATV 10 for supporting the rear storage box assembly 400. The rear receptacle 97a is formed by the cowlings 90 covering a top, rear portion 21a of the frame 20.

The ATV 10 further includes other components such as an air intake system, an exhaust system, headlights, and the like. As it is believed that these components would be readily recognized by one of ordinary skill in the art, further explanation and description of these components will not be provided herein.

Figure 4:
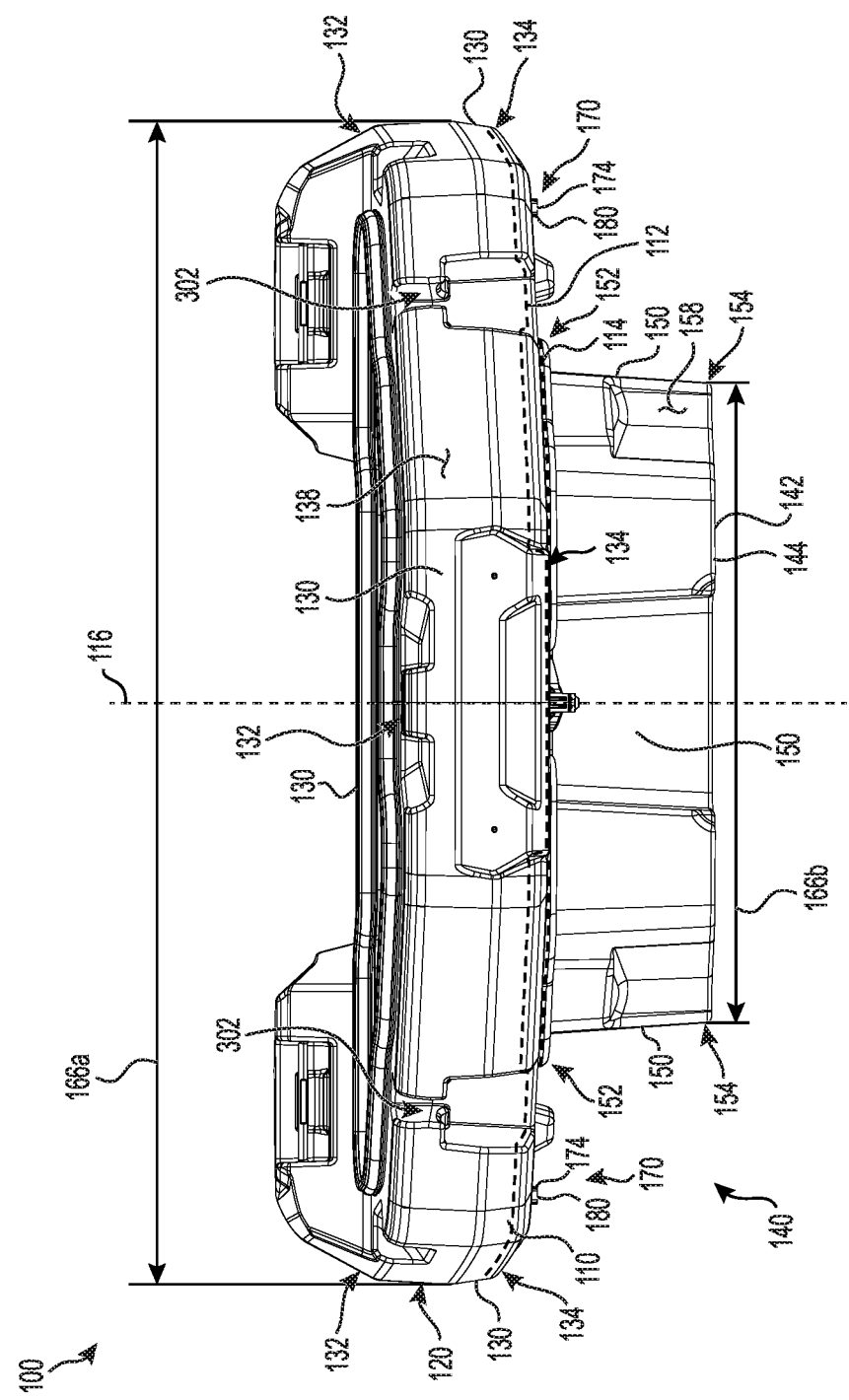
FIG. 4 is front elevation view of the front storage box assembly of FIG. 1, with the lid omitted.
Figure 11:
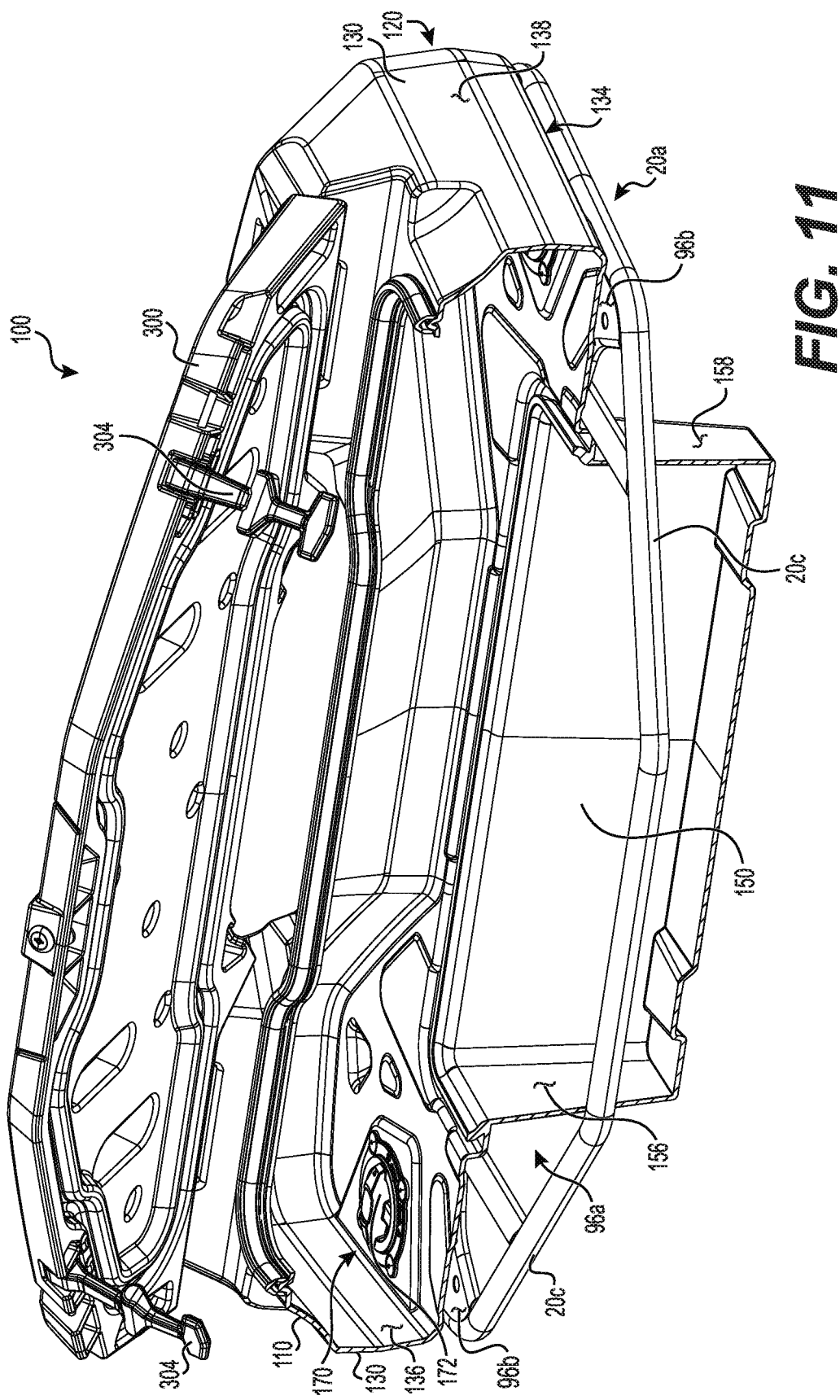
FIG. 11 is a perspective view taken from a top, front, left side of the front portion of the frame and the front storage box assembly of FIG. 10, with the front storage box assembly shown in cross-section, with the cross-section being taken along cross-section line A-A of FIG. 10.

The front storage box assembly 100 will now be described in more details with reference to FIGS. 4 to 7B. The front storage box assembly 100 includes a box 110 having an upper portion 120 and a lower portion 140. The upper portion 120 includes a bottom wall 122 having an inner periphery 124 and an outer periphery 126, both shown in dashed lines in FIG. 5. The upper portion 120 of the box 110 also defines left and right recesses 128. The upper portion 120 further includes side walls 130 extending from the outer periphery 126 of the bottom wall 122 and above the bottom wall 122. The side walls 130 have an upper end 132 and a lower end 134 defined consistently with a vertical direction of the front storage box assembly 100 when secured to the ATV 10. The side walls 130 also have an inner side 136 (FIG. 11) and an outer side 138 (FIGS. 4 and 11). As best seen in FIGS. 6A to 7B, the left and right recesses 128 extend upwardly towards the upper end 132 of the side walls 130. Referring to FIG. 4, the side walls 130 are generally tapered between their upper end 132 and their lower end 134, but they could extend otherwise in other implementations. The lower end 134 of the side walls 130 defines an outer periphery 112 of the box 110 shown as a dashed line in FIGS. 4 and 5.

Figure 5:
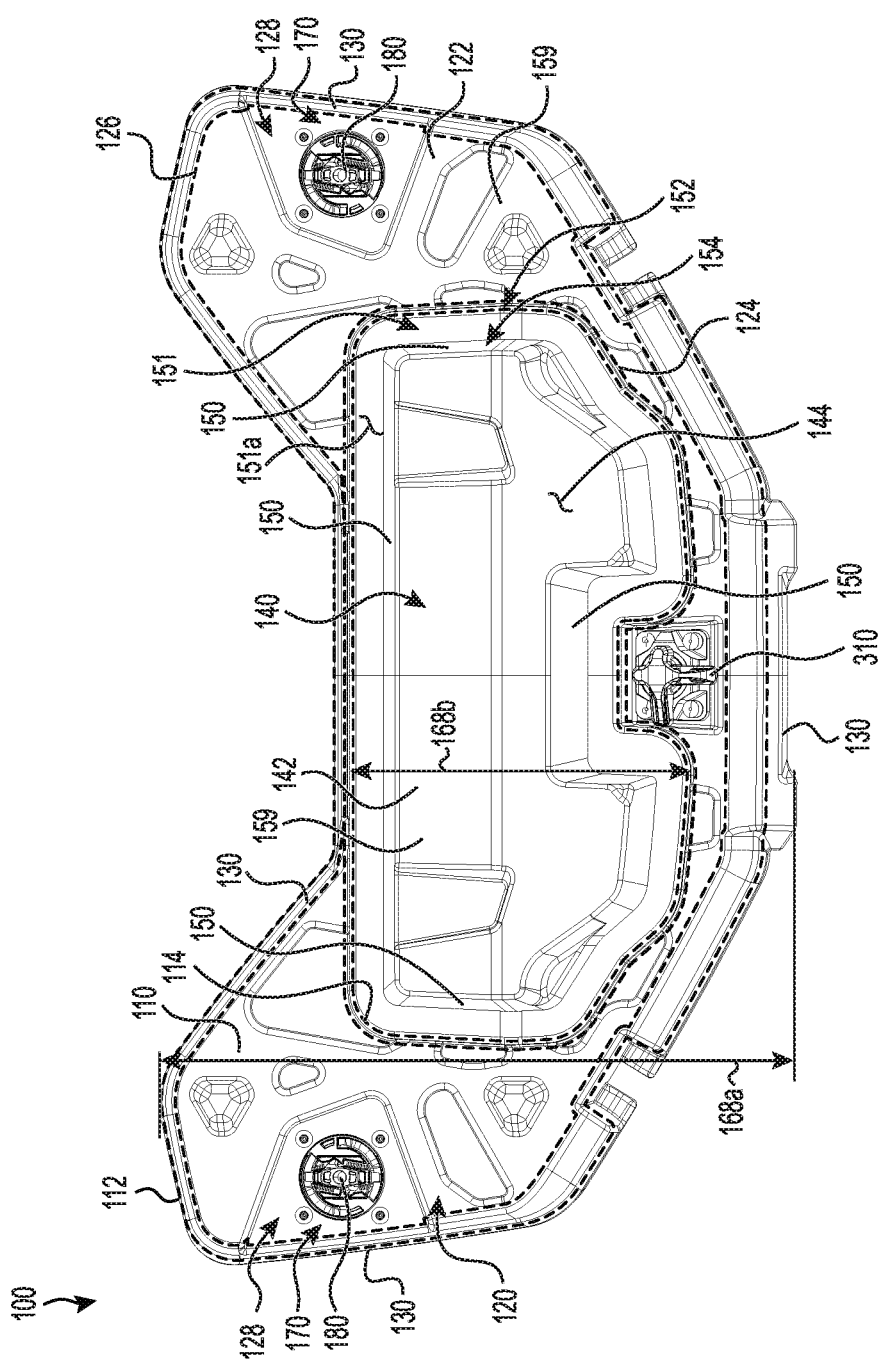
FIG. 5 is a bottom plan view of the front storage box assembly of FIG. 4, with the left and right anchors in an unlocked position.
Figure 6A:
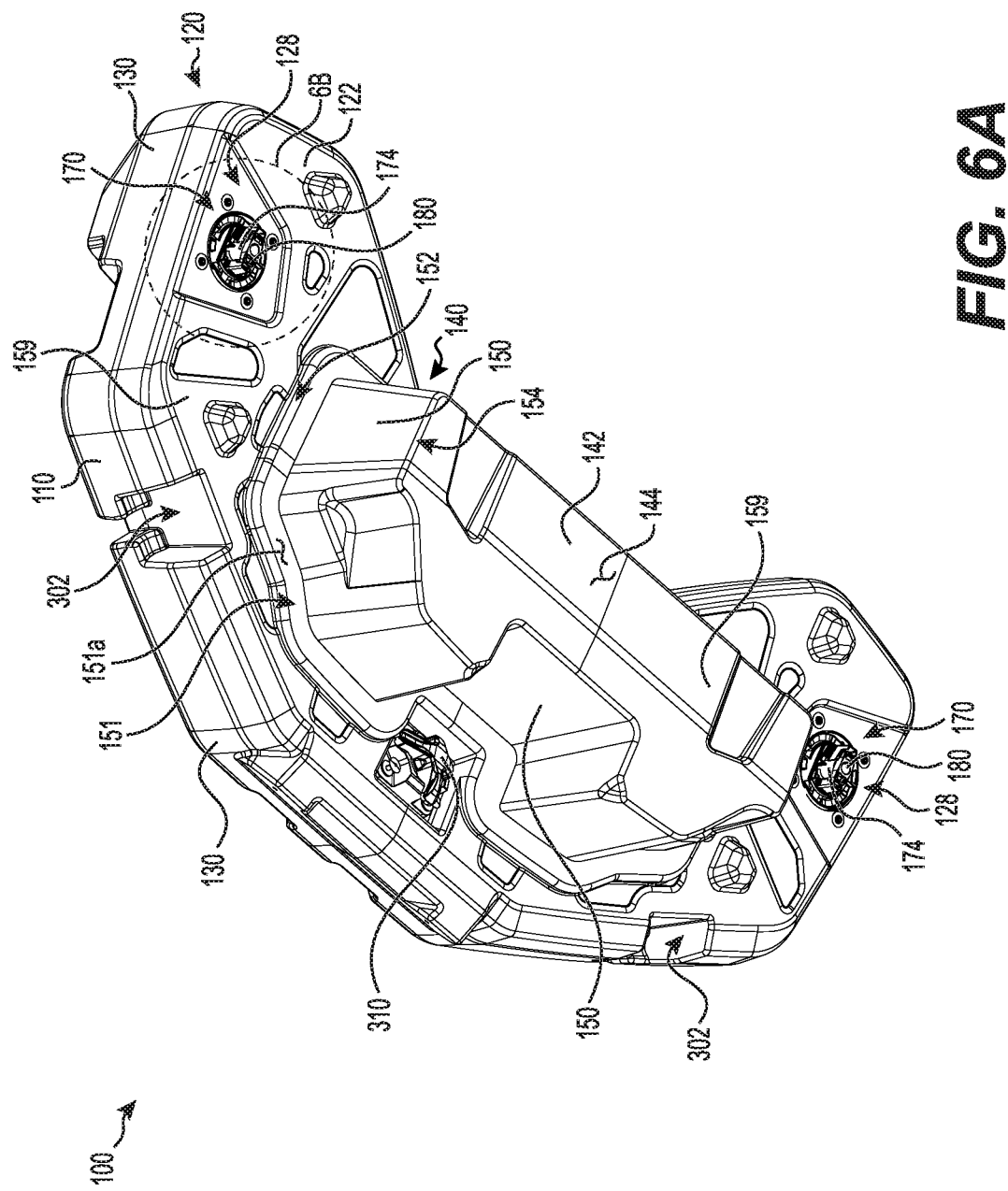
FIG. 6A is a perspective view taken from a bottom, front, left side of the front storage box assembly of FIG. 4, with the left anchor in the unlocked position.

The lower portion 140 of the box 110 includes a bottom wall 142 and side walls 150. The bottom wall 142 has a lower surface 144 facing downwardly when the front storage box assembly 100 is secured to the ATV 10. The side walls 150 of the lower portion 140 have an upper end 152 and a lower end 154. The side walls 150 also have an inner side 156 (FIG. 11) and an outer side 158 (FIGS. 4 and 11). Upper portions of the side walls 150 collectively define an intermediate wall 151 having a surface 151a facing downwardly when the front storage box assembly 100 is secured to the ATV 10. The intermediate wall 151 extends above the bottom wall 142 and the below the bottom wall 122. The side walls 150 extend from the inner periphery 124 of the bottom wall 122 below the bottom wall 122. As such, the upper end 152 of the side walls 150 is connected to the portion of the bottom wall 122 defining the inner periphery 124. The side walls 150 are tapered between their upper end 152 and their lower end 154. As such, the lower end 154 of the left, right and front side walls 150 is located further away from the inner periphery 124 of the bottom wall 122 compared to the upper end 152 of the side walls 150. The side walls 150 could extend otherwise in other implementations. The side walls 150 define an outer periphery 114 of the box 110 at the upper end 152 of the side walls 150. As best seen in FIG. 5, the outer periphery 114 is disposed within the outer periphery 112. In other implementations, the outer periphery 114 is disposed in part within the outer periphery 112.

Still referring to FIGS. 4 to 7B, a longitudinal center plane 116 extends vertically and longitudinally through the lateral center of the box 110. The longitudinal center plane 116 is coplanar with the longitudinal center plane 16 of the ATV 10 when the front storage box assembly 100 is secured to the ATV 10, as shown in FIG. 3. The bottom walls 122, 142 and some of the side walls 130, 150 have ridges 159 to enhance the structural rigidity thereof. It is contemplated that the structure and shape of the bottom walls 122, 142 and of the side wall 130, 150 could differ in other implementations.

Figure 10:
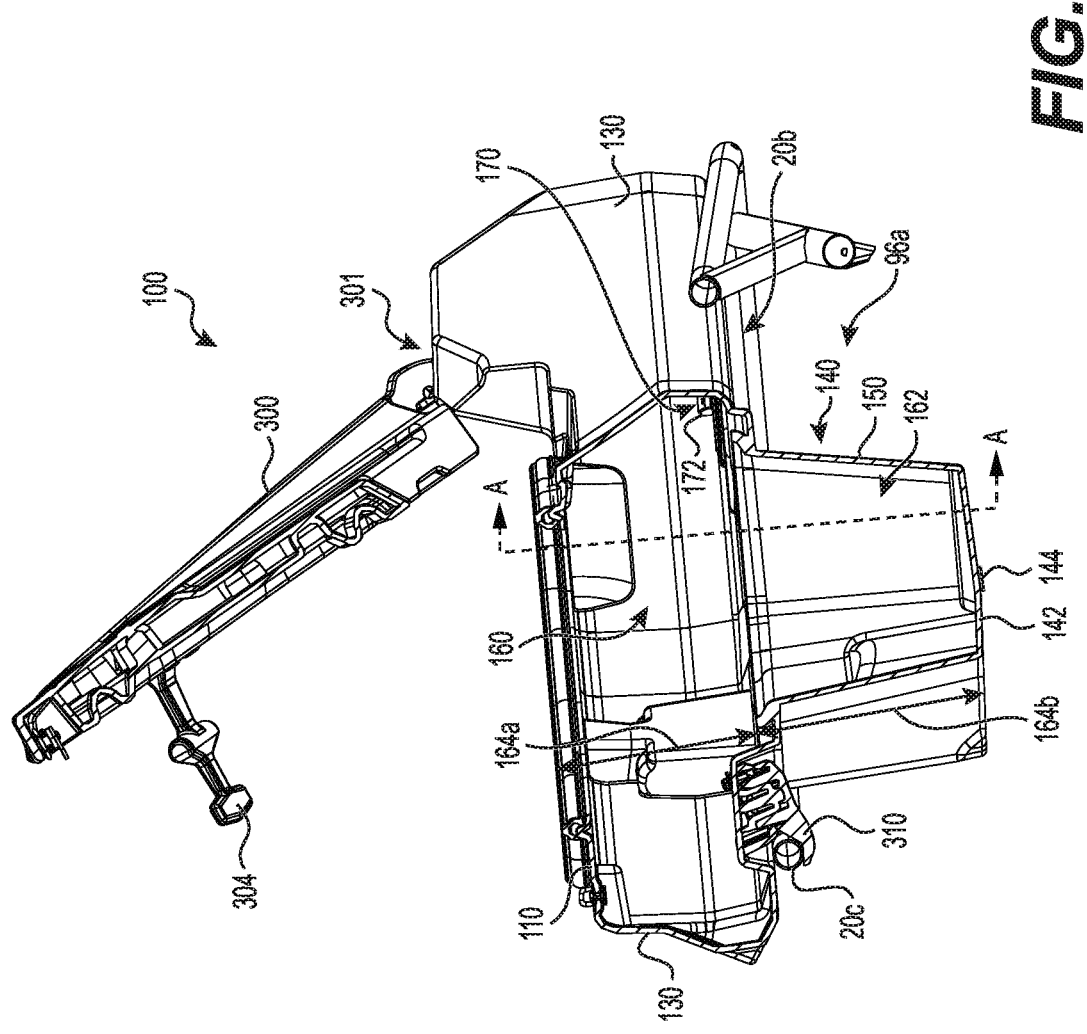
FIG. 10 is a longitudinal cross-sectional view of a front portion of the frame of FIG. 8 supporting the front storage box assembly, with the lid of the front storage box assembly in an open position.

Referring to FIGS. 10 and 11, the upper portion 120 of the box 110 has an interior volume 160 communicating with an interior volume 162 of the lower portion 140. The interior volume 160 of the upper portion 120 is greater than the interior volume 162 of the lower portion 140. More particularly, the interior volume 160 of the upper portion 120 is of about 47 liters, while the interior volume 162 of the lower portion 140 is of about 29 liters. Thus, the total interior volume of the box 110 is of about 76 liters. Furthermore, a maximum height 164b of the side walls 150 of the lower portion 140 is greater than a maximum height 164a of the side walls 130 of the upper portion 120 (FIG. 10).

In addition, and as best seen in FIG. 4, a maximum width 166a between the upper ends 132 of laterally opposite side walls 130, i.e. side walls 130 disposed on opposite sides of the longitudinal center plane 116, is greater than a maximum width 166b between the lower ends 154 of laterally opposite side walls 150, i.e. side walls 150 disposed on opposite sides of the longitudinal center plane 116. The maximum widths 166a, 166b extend perpendicular to the longitudinal center plane 116. Moreover, and as best seen in FIG. 5, a maximum length 168a between the upper ends 132 of longitudinally opposite side walls 130, i.e. the front and rear side walls 130 of the upper portion 120, is greater than a maximum length 168b between the lower ends 154 of longitudinally opposite side walls 150, i.e. the front and rear side walls 150 of the lower portion. The maximum lengths 168a, 168b extend parallel to the longitudinal center plane 116 of the box 110. It is contemplated that the side walls 130, 150 could be structured and dimensioned otherwise in other implementations.

Still referring to FIGS. 4 to 7B, the front storage box assembly 100 further includes left and right anchors 170 mounted to the box 110 for selectively securing the front storage box assembly 100 to the ATV 10. As best seen in FIGS. 5 to 7B, the left and right anchors 170 are disposed within the outer periphery 126 of the bottom wall 122. More particularly, the left and right anchors 170 are disposed between the inner periphery 124 and the outer periphery 126 of the bottom wall 122. The left and right anchors 170 are also disposed on opposite sides of the longitudinal center plane 116 of the box 110. The left and right anchors 170 selectively secure the box 110 to the ATV 10 when inserted in corresponding left and right apertures 200 (FIG. 8) defined on the ATV 10 and upon rotation of a lever 172 (FIG. 11) provided on each of the left and right anchors 170. In the present implementation, the left and right anchors 170 are similar to the anchor described in U.S. Pat. No. 8,875,830 B2 dated Nov. 4, 2014, the entirety of which is incorporated by reference herein. The anchors 170 could be configured otherwise in other implementations of the present technology.

Referring to FIGS. 4 to 11, the left and right anchors 170 each include a latch 174 that is connected to the lever 172. The latch 174 includes a pair of cams 176 (FIGS. 5 to 7B) constituting a lower flange 178 of each of the anchors 170. The pair of cams 176 defines a hexagonal shape that is congruent with the corresponding aperture 200 provided on the ATV 10 which is shaped for receiving the latch 174 of the corresponding anchor 170. As best seen in FIG. 10, the left and right apertures 200 are defined in the planar members 20d of the portion 20a of the frame 20, and have a hexagonal shape that is congruent with the pair of cams 176 of the left and right latches 174. On each of the left and right anchors 170, the latch 174 (and the pair of cams 176) is rotatable between an unlocked position (FIG. 6B) and a locked position (FIG. 7B) when the lever 172 is rotated by about 90 degrees. The left and right anchors 170 are manually-operable anchors. Thus, the left and right anchors 170 can be configured in the unlocked and locked positions upon manual operation of the left and right levers 172 and without any tools. In other words, when the left and right lower flanges 178 extend through the left and right apertures 200 and are configured in the locked position, the lower flanges 178 are rotated by about 90 degrees and are retained by the planar members 20d of the portion 20a of the frame 20 since their hexagonal shape is no longer congruent with the hexagonal shape of the apertures 200.

It is to be noted that the left and right levers 172 are disposed inside the box 110, and thus the left and right anchors 170 are operable from inside the box 110. As shown in FIGS. 6A to 7B, the left and right latches 174 are disposed at least in part within the left and right recesses 128. Each of the left and right latches 174 also defines a bottom surface 180 (FIGS. 4, 6B and 7B) of the corresponding left and right anchors 170. The bottom surfaces 180 of the left and right anchors 170 is vertically spaced from the lower surface 144 of the bottom wall 142. More particularly and as best seen in FIGS. 4 and 6A to 7B, the bottom surfaces 180 of the left and right anchors 170 are disposed between the upper end 132 of the side walls 130 and the bottom wall 142. This positioning of the bottom surfaces 180 of the left and right anchors 170 relative to the lower surface 144 of the bottom wall 142 is advantageous in different ways because, when the box 110 is disposed on a flat surface, the left and right anchors 170 do not bear a load caused by the weight of the box 110 and its content. In addition, in situations where the box 110 lies on a muddy or snowy ground surface, the left and right latches 174, being vertically spaced from the lower surface 144 of the bottom wall 142, are less exposed to mud, snow or debris that could become stuck thereon.

Referring now to FIGS. 8 to 11, the front storage box assembly 100 further includes a lid 300 connected to the upper portion 120 of the box 110. The lid 300 selectively prevents access to the interior volumes 160, 162 of the upper and lower portion 120, 140 when closed. The lid 300 is removably connected to the box 110. When connected, the lid 300 is pivotally connected to the box 110 via hinge assemblies 301 connected to the rear side wall 130. The front side wall 130 defines recesses 302 in which stretchable rubber straps 304 connected to the lid 300 are receivable for securing the lid 300 to the box 110 in the closed position shown in FIGS. 1 to 3, 8 and 9. When the stretchable rubber straps 304 are withdrawn from the recesses 302, the lid 300 can be moved in the open position, shown in FIGS. 10 and 11.

Figure 8:
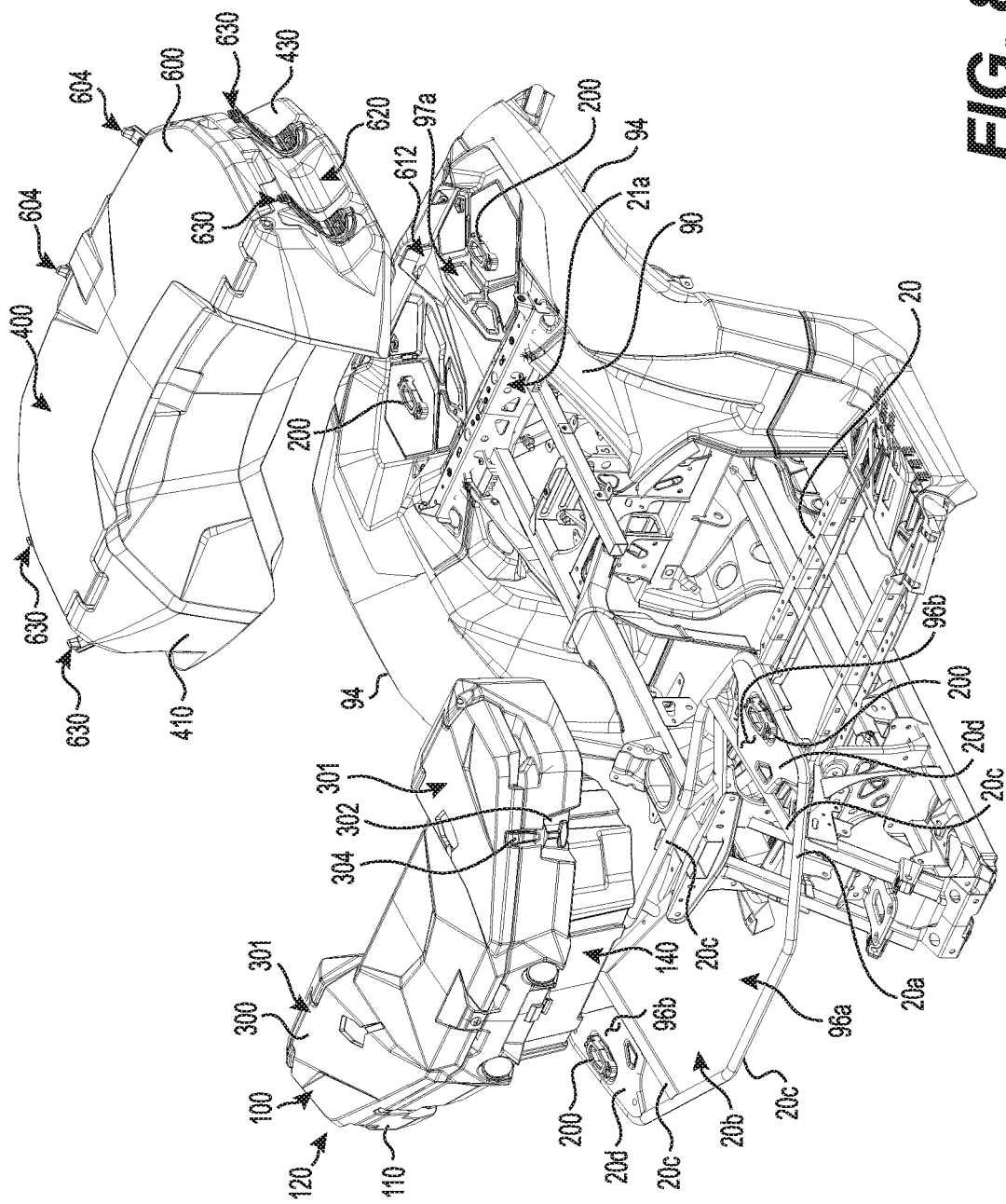
FIG. 8 is a perspective view, taken from a top, front, left side of a frame and some body portions of the vehicle of FIG. 1, with the front and rear storage box assemblies shown removed from the vehicle.
Figure 9:
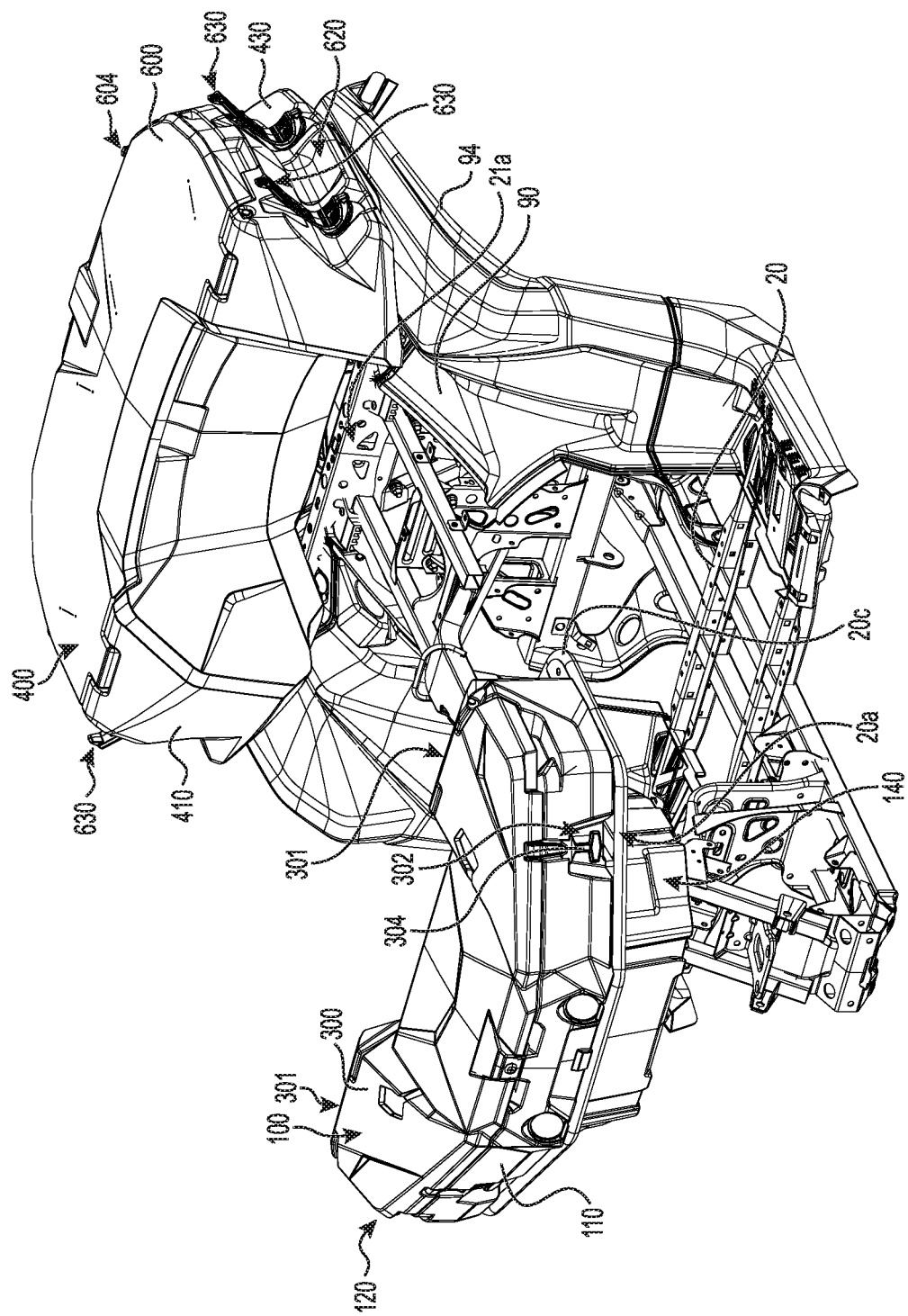
FIG. 9 is a perspective view taken from a top, front, left side of the frame and body portions of FIG. 8, with the front and rear storage box assemblies secured to the vehicle.

With reference to FIGS. 8 to 11, an illustrative scenario describing the installation and use of the front storage box assembly 100 with the ATV 10 is provided below. Initially, the front storage box assembly 100 is separate from the ATV 10. When a user desires to install the front storage box assembly 100 on the ATV 10, the user first opens or removes the lid 300 and operates the levers 172 of the left and right anchors 170 so as to configure them in the unlocked position (shown in FIG. 6B), if this is not already the case. The user then disposes the front storage box assembly 100 above the front receptacle 96a provided on the ATV 10, as shown in FIG. 8, engages a tongue 310 (FIG. 10) projecting from the upper portion 120 of the box 110 to a tubular member 20c defining the portion 20a of the frame 20, and inserts the lower portion 140 of the box 110 in the front receptacle 96a until (i) the left and right latches 174 and their respective pairs of cams 178 are received in the corresponding left and right apertures 200, and (ii) the bottom wall 122 abuts the top surface 96b of the front receptacle 96a. The box 110 is then supported on the ATV 10 by the top surface 96b of the front receptacle 96a and by the portion 20a of the frame 20. More particularly and as can be seen in FIG. 11, the tubular members 20c defining the portion 20a of the frame 20 extend below the left, right, front and rear side walls 130 of the upper portion 120 along the inner periphery 124. As such, the upper portion 120 of the box 110 extends above the portion 20a of the frame 20 and is supported by the portion 20a of the frame 20, while the lower portion 140 of the box 110 extends through the opening 20b defined by the portion 20a of the frame 20. When the user has inserted the left and right latches 174 in the corresponding left and right apertures 200, the user rotates the levers 172 by about 90 degrees to move the left and right latches 174 from the unlocked position (FIG. 6B) to the locked position (FIG. 7B), thus preventing the latches 174 from being removed from the apertures 200. The front storage box assembly 100 is therefore selectively secured to the ATV 10 and the user can use the front storage box assembly 100 to carry accessories and cargo while the ATV 10 is being operated. The user can open and close the lid 300 using the stretchable rubber straps 304. When the user desires to remove the front storage box assembly 100 from the ATV 10, the user opens or remove the lid 300, rotates the levers 172 by about 90 degrees to move the left and right latches 174 from the locked position (FIG. 7B) to the unlocked position (FIG. 6B), and withdraws the box 110 from the receptacle 96a by pulling the front storage box assembly 100 upwardly.

Referring now to FIGS. 12 to 16B, the rear storage box assembly 400 will be described in more details. As mentioned above, when secured to the ATV 10, the rear storage box assembly 400 is disposed rearwardly of the handlebar 82, and more particularly rearwardly of the driver seat 70. The rear storage box assembly 400 includes elements that are the same as or similar to those described with reference to the front storage box assembly 100.

Figure 12:
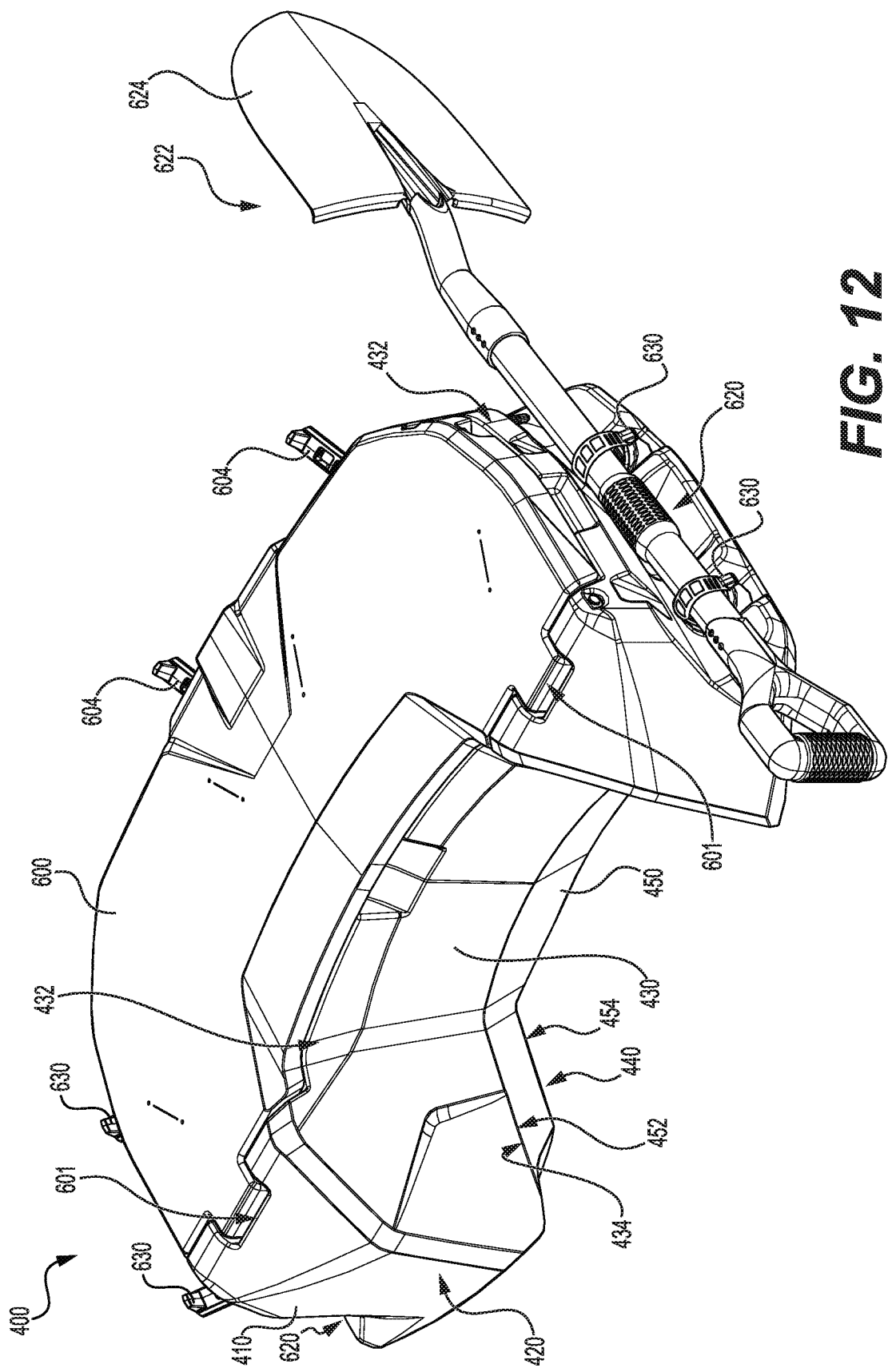
FIG. 12 is a perspective view taken from a top, front, left side of the rear storage box assembly of FIG. 1, with an accessory received in a left accessory holder of the rear storage box assembly.

As best seen in FIGS. 1 and 12, the rear storage box assembly 400 includes a box 410 with a lid 600 pivotally connected thereto via hinge assemblies 601. The lid 600 is shown in the open position in FIG. 16B. The box 410 of the rear storage box assembly 400 has an upper portion 420 and a lower portion 440. The upper portion 420 of the box 410 of the rear storage box assembly 400 is shaped to provide a backrest to the driver when seated in the driver seat 70. Like in the front storage box assembly 100, a longitudinal center plane 416 of the box 410 is coplanar with the longitudinal center plane 16 of the ATV 10 when the rear storage box assembly 400 is secured to the ATV 10.

Figure 13:
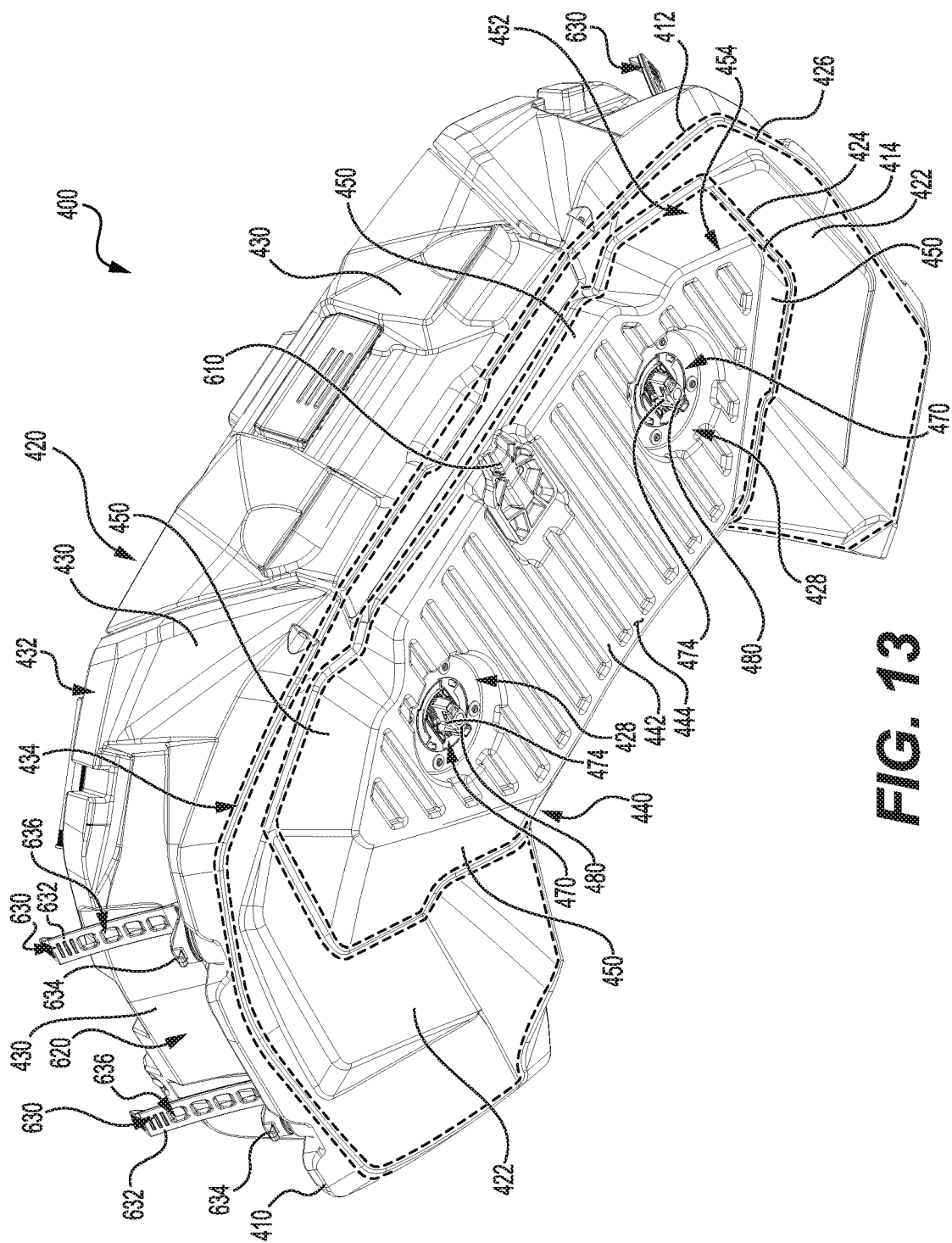
FIG. 13 is a perspective view taken from a bottom, rear, left side of the rear storage box assembly of FIG. 12, with the accessory and the lid omitted and the left and right anchors in unlocked positions.
Figure 14:
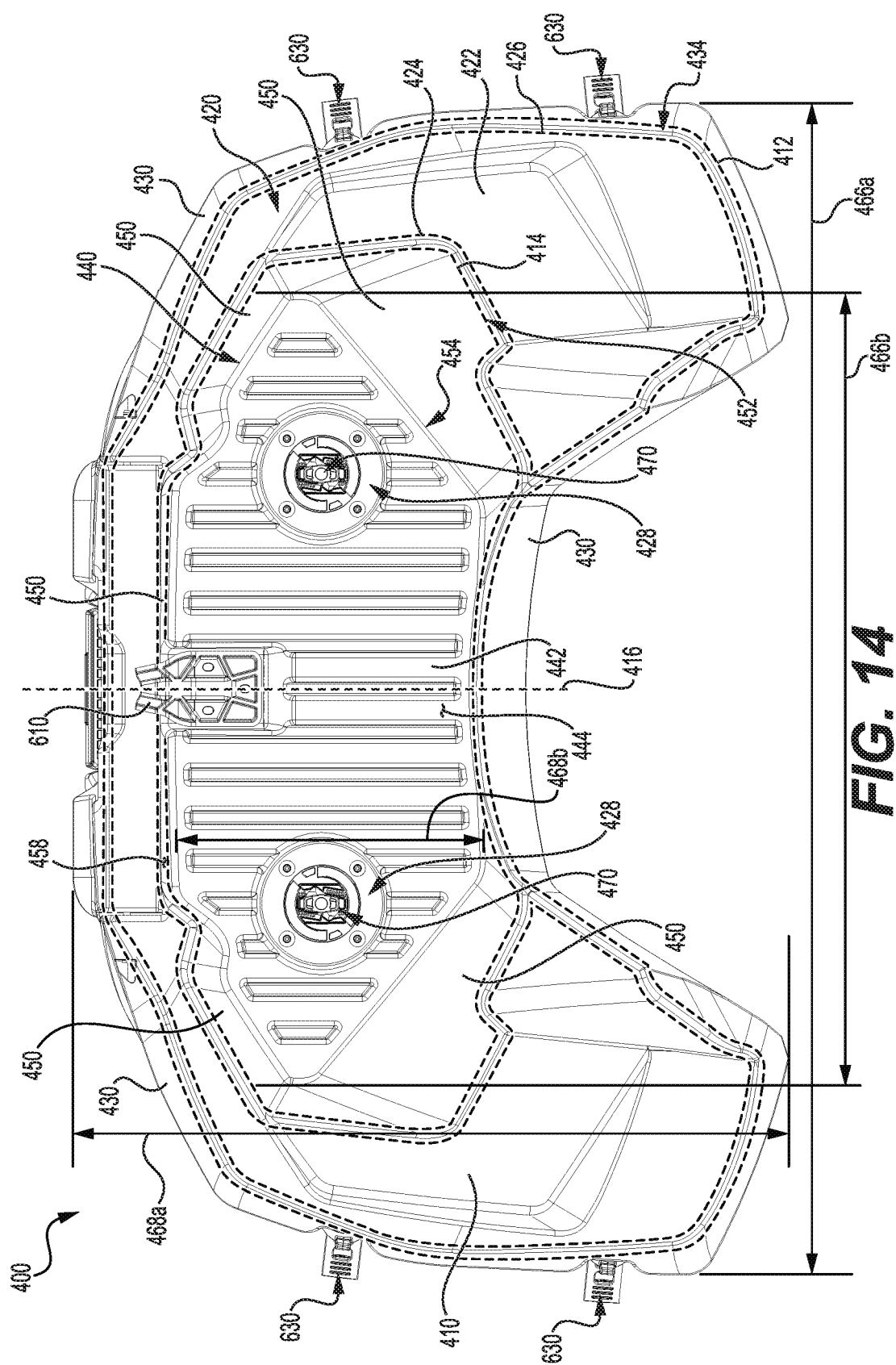
FIG. 14 is a bottom plan view of the rear storage box assembly of FIG. 13.

Referring to FIGS. 12 to 14, the upper portion 420 includes a bottom wall 422 having an inner periphery 424 and an outer periphery 426 both shown in dashed lines in FIGS. 13 and 14. The upper portion 420 also includes side walls 430 having an upper end 432 and a lower end 434. The lower end 434 of the side walls 430 defines an outer periphery 412 of the box 410, also shown as a dashed line in FIGS. 13 and 14. The lid 600 is maintained in the closed position (shown in FIG. 12) using stretchable rubber straps 604 receivable in recesses (not shown) defined in the rear side wall 430. The lower portion 440 includes a bottom wall 442 having a lower surface 444, and side walls 450 having an upper end 452 and a lower end 454. In the lower portion 440, the side walls 450 define an outer periphery 414 (FIGS. 13 and 14) of the box 410 at the upper end 452 of the side walls 450. The outer periphery 414 is disposed within the outer periphery 412.

Figure 16A:
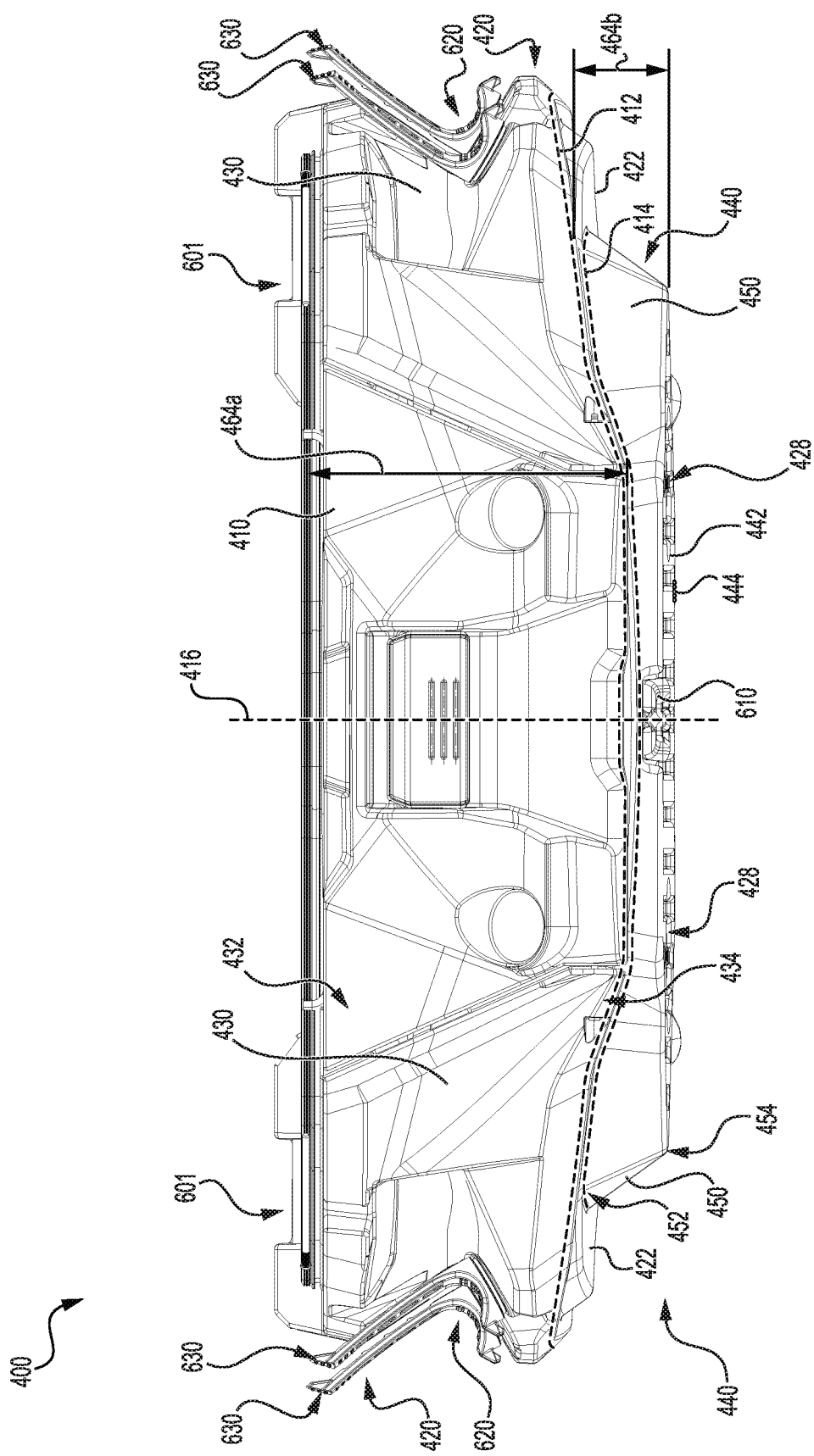
FIG. 16A is a rear elevation view of the rear storage box assembly of FIG. 13.

Still referring to FIGS. 13 and 14 and in contrast with the front storage box assembly 100, the lower portion 440 of the box 410 of the rear storage box assembly 400 defines left and right recesses 428 in the bottom wall 442. The left and right recesses 428 are disposed on opposite sides of the longitudinal center plane 416 of the box 410 (FIG. 16A). The left and right recesses 428 extend upwardly toward the upper portion 420 of the box 410, and left and right anchors 470 are disposed at least in part within the left and right recesses 428. Each of the left and right anchors 470 includes a lever 472 disposed inside the box 410, and a latch 474 connected to the lever 472. More particularly, latches 474 of the left and right anchors 470 extend in the corresponding left and right recesses 428 such that bottom surfaces 480 of the left and right anchors 470 are vertically spaced from a lower surface 444 of the bottom wall 442. In addition, the bottom surfaces 480 are also disposed between the upper end 432 of the side walls 430 and the bottom wall 442. Furthermore, the left and right anchors 470 are disposed within the outer peripheries 412, 414 of the box 410, which is in contrast with the front storage box assembly 100.

By having the bottom surfaces 480 of the left and right anchors 470 vertically spaced from the lower surface 444 of the bottom wall 442, the bottom surfaces 480 do not contact a flat surface on which the bottom wall 442 of the box 410 could lie. This is best understood with reference to FIG. 16A in which the lower surface 444 of the bottom wall 442 can be seen, but not the bottom surfaces 480 of the left and right anchors 470. This positioning of the bottom surfaces 480 relative to the lower surface 444 of the bottom wall 442 is advantageous in different ways because, when the box 410 is disposed on a flat surface, the left and right anchors 470 do not bear a load caused by the weight of the box 410 and its content. In addition, in situations where the box 410 lies on a muddy or snowy ground surface, the left and right latches 474, being received in the left and right recesses 428, are less exposed to mud, snow or debris that could become stuck thereon. As in the front storage box assembly 100, in the present implementation of the rear storage box assembly 400, the left and right anchors 470 are similar to the anchor described in U.S. Pat. No. 8,875,830 B2 dated Nov. 4, 2014, which is incorporated by reference herein in its entirety. The anchors 470 could be configured otherwise in other implementations of the present technology.

Referring to FIGS. 14 to 16A, the upper portion 420 has an interior volume 460 that is larger than an interior volume 462 of the lower portion 440. A maximum height 464b of the side walls 450 is smaller than a maximum height 464a of the side walls 430 (FIG. 16A). In addition and as best seen in FIG. 14, a maximum width 466a between the upper ends 432 of laterally opposite side walls 430 is greater than the maximum width 466b between the lower ends 454 of laterally opposite side walls 450. Furthermore, like in the front storage box assembly 100, a maximum length 468a between the upper ends 432 of longitudinally opposite side walls 430 is greater than a maximum length 468b between the lower ends 454 of longitudinally opposite side walls 450.

Figure 15:
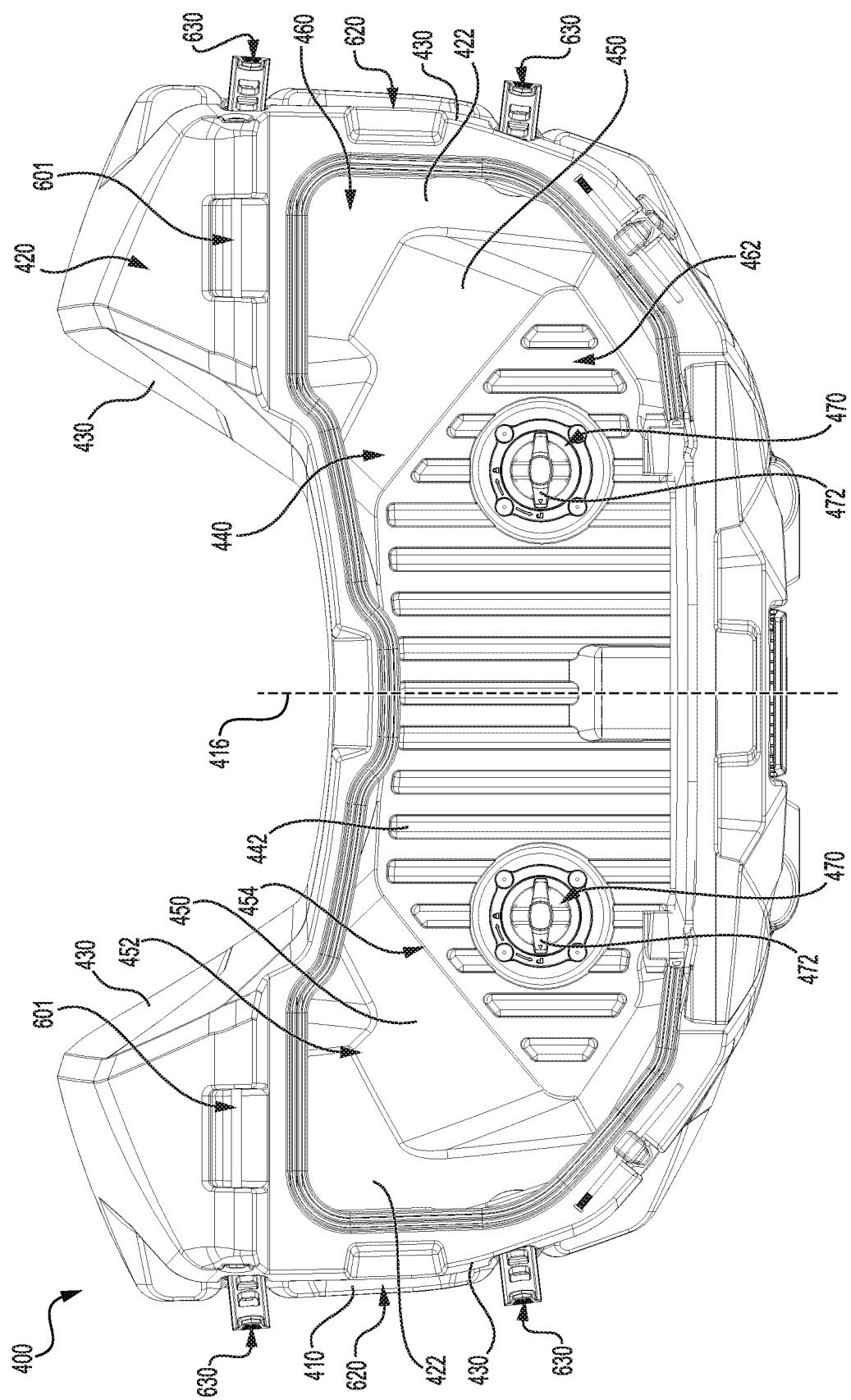
FIG. 15 is a top plan view of the rear storage box assembly of FIG. 13.

Referring to FIGS. 15 and 16A, a tongue 610 is connected to the lower portion 440 of the box 410. The tongue 610 projects outwardly of an outer side 458 of the rear side wall 450. More particularly, the tongue 610 extends past the outer periphery 414 defined at the upper end 452 of the side walls 450. The longitudinal center plane 416 of the box 410 intersects the tongue 610 (FIG. 16A). The tongue 610 is receivable in an aperture 612 (FIG. 8) defined in the cowlings 90 of the ATV 10 covering the top, rear portion 21a of the frame 20. The tongue 610 may assist a user in positioning the rear storage box assembly 400 in the rear receptacle 97a for securing the rear storage box assembly 400 to the ATV 10. In addition, when the tongue 610 is received in the aperture 612, the tongue 610 further supports the rear storage box assembly 400 on the ATV 10.

Referring to FIGS. 12 and 13, in the rear storage box assembly 400, the outer sides 438 of the left and right side walls 430 define left and right accessory holders 620 for receiving one or more accessories 622. In FIG. 12, the accessory 622 is a shovel 624, and the shovel 624 is received in the left accessory holder 620. Two securing devices 630, in the form of perforated rubber straps 632 with hooks 634, are connected to the outer side 438 of each of the left and right side walls 430 for securing the accessories 622 when received in the left and right accessory holders 620. To secure an accessory 622 in one of the left and right accessory holders 620, a user unfastens one or the two perforated rubber straps 632, positions the accessory 622 against the outer side 438 of the corresponding side wall 438, and wraps the perforated rubber strap(s) 632 tightly around the accessory 622 until the hook 634 is engaged in one of the holes 636 (FIG. 13) of the perforated rubber strap 632. Other types of securing devices 630 could be used in other implementations.

With reference to FIGS. 10, 11 and 12 to 16A, an illustrative scenario describing the installation and use of the rear storage box assembly 400 with the ATV 10 is provided below. Initially, the rear storage box assembly 400 is separate from the ATV 10. When a user desires to install the rear storage box assembly 400 on the ATV 10, the user first opens or removes the lid 600 and operates the levers 472 of the left and right anchors 470 so as to configure them in the unlocked position (shown in FIGS. 13 and 14), if this is not already the case. The user then disposes the rear storage box assembly 400 above the rear receptacle 97a provided on the ATV 10, as shown in FIG. 8, inserts the tongue 610 in the aperture 612, and lowers the lower portion 440 of the box 410 within the rear receptacle 97a until (i) the left and right latches 474 are received in the corresponding left and right apertures 200, and (ii) the bottom wall 422 abuts the cowlings 90 forming the rear receptacle 97a. The box 410 is then supported on the ATV 10 by the engagement of the tongue 610 in the recess 612 and by the lower portion 440 being received in the rear receptacle 97a. When the user has inserted the left and right latches 474 in the corresponding left and right apertures 200, the user rotates the levers 472 by about 90 degrees to move the left and right latches 474 from the unlocked position (FIG. 13) to the locked position (similar to what is shown in FIG. 7B), thus preventing the latches 474 from being removed from the apertures 200. The rear storage box assembly 400 is therefore selectively secured to the ATV 10 and the user can use the rear storage box assembly 400 to carry accessories and cargo in the box 410 while the ATV 10 is being operated. The user can also secure accessories 622 in the left and right accessory holders 620, if needed. When the user desires to remove the rear storage box assembly 400 from the ATV 10, the user opens or remove the lid 600, rotates the levers 472 by about 90 degrees to move the left and right latches 474 from the locked position to the unlocked position, and withdraws the box 410 from the rear receptacle 97a by pulling the rear storage box assembly 400 upwardly.

Referring now to FIGS. 17 to 21, the rear storage box assembly 800 will be described. The rear storage box assembly 800 is designed to be secured to the rear of a snowmobile 1000, but could also be secured to other types of vehicles. Before describing the rear storage box assembly 800, the snowmobile 1000 will be briefly described.

Figure 17:
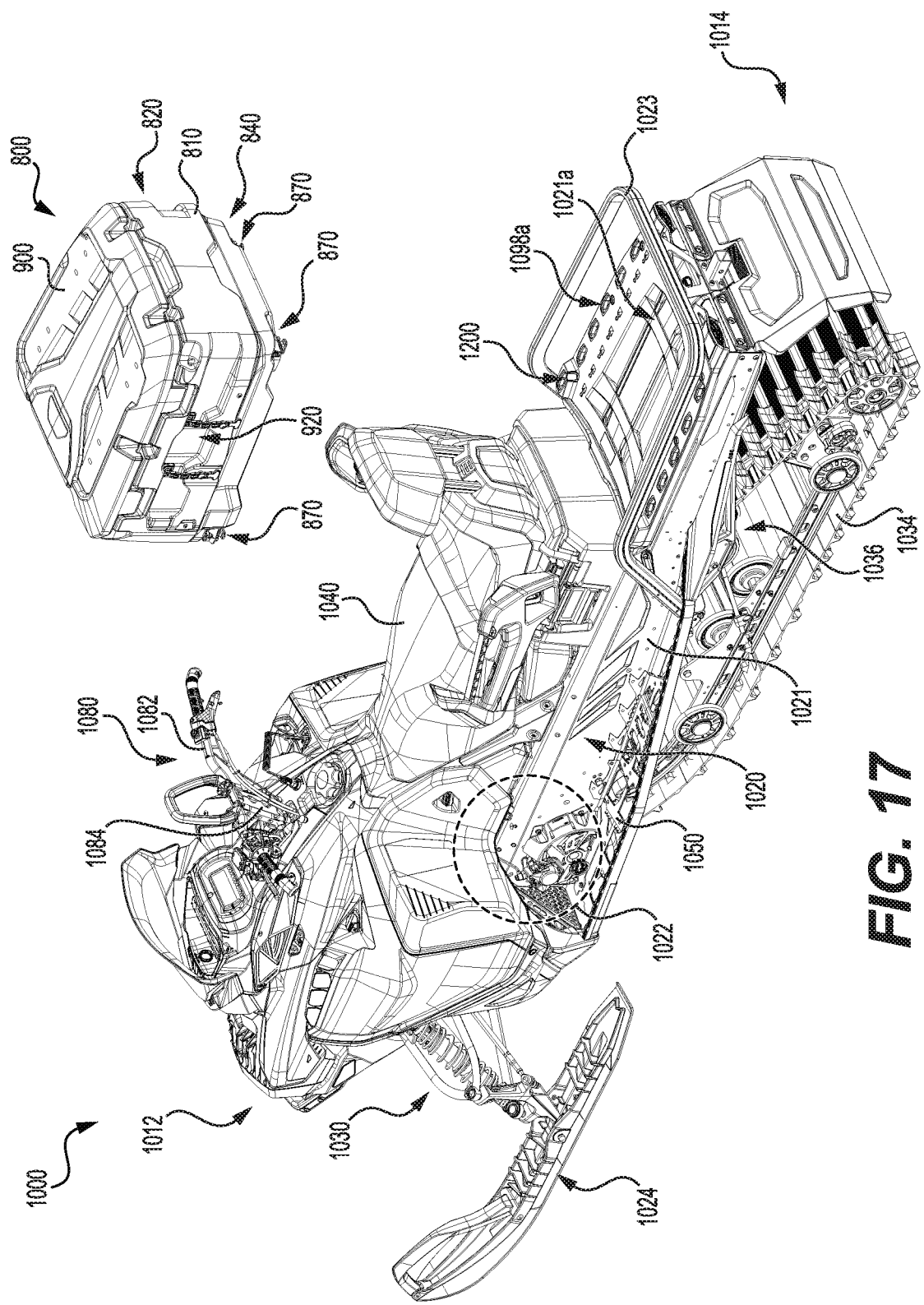
FIG. 17 is a perspective view taken from a top, rear, left side of a snowmobile, with another implementation of a rear storage box assembly shown removed from a rear portion of the tunnel.

Referring to FIG. 17, the snowmobile 1000 will be described. The snowmobile 1000 has the front end 1012 and the rear end 1014 defined consistently with the forward travel direction of the snowmobile 1000. The snowmobile 1000 includes a frame 1020. The frame 1020 includes a tunnel 1021, a motor module (not shown) and a suspension module (not shown).

Front left and right suspension assemblies 1030 (only the left suspension assembly 1030 is shown) are connected to the frame 1020. A motor 1022 (schematically shown in FIG. 17) is received in the motor module of the frame 1020. In the present implementation, the motor 1022 is a two-stroke, two-cylinder, internal combustion engine. However, it is contemplated that other types of motors could be used such as, but not limited to, an electric motor or a four-stroke internal combustion engine. Left and right ski assemblies 1024 (only the left ski assembly 1024 is shown) are positioned at the front end 1012 of the snowmobile 1000. The right ski assembly 1024 is, in some implementations, a mirror image of the left ski assembly 1024.

An endless drive track 1034 is disposed under the tunnel 1021. The endless drive track 1034 is operatively connected to the motor 1022 through a continuously variable transmission (CVT, not shown) and other components not described herein. The endless drive track 1034 is suspended for movement relative to the frame 1020, by a rear suspension assembly 1036. The endless drive track 1034 is driven to run about the rear suspension assembly 1036 for propulsion of the snowmobile 1000.

A seat 1040 is disposed on the frame 1020 and is adapted to support a rider. Two footrests 1050 are positioned on opposite sides of the tunnel 1021 below the seat 1040 to support the rider's feet (only the left footrest 1050 is shown). The footrests 1050 are integrally formed with the tunnel 1021. The snowmobile 1000 has a steering assembly 1080 rotationally connected to the frame 1020 to enable a driver to steer the snowmobile 1000. The steering assembly 1080 includes a handlebar 1082 connected to a steering column assembly 1084 for actuating steering linkages operatively connected to left and right ski assemblies 1024. The snowmobile 1000 further includes other components such as an air intake system, an exhaust system, headlights, and the like. As it is believed that these components would be readily recognized by one of ordinary skill in the art, further explanation and description of these components will not be provided herein.

The tunnel 1021 defines a rear receptacle 1098a in a rear portion 1021a of the tunnel 1021. The rear receptacle 1098a is provided on the snowmobile 1000 for supporting the rear storage box assembly 800. The rear receptacle 1098a is formed by the rear portion 1021a of the tunnel 1021 and a rail assembly 1023 connected to the tunnel 1021. A portion of the rail assembly 1023 extends above the tunnel 1021 and surrounds part of the rear portion 1021a of the tunnel 1021. Front left, front right, rear left, and rear right apertures 1200 are defined in the rear receptacle 1098a (only the front right aperture 1200 is shown). When the rear storage box assembly 800 is received at least in part in the rear receptacle 1098a, the rear storage box assembly 800 is disposed rearwardly of the handlebar 1082 and the seat 1040 of the snowmobile 1000.

Turning now to FIGS. 18 to 21, the rear storage box assembly 800 will be described. The rear storage box assembly 800 includes elements that are the same as or similar to those described with reference to the storage box assemblies 100, 400.

Figure 18:
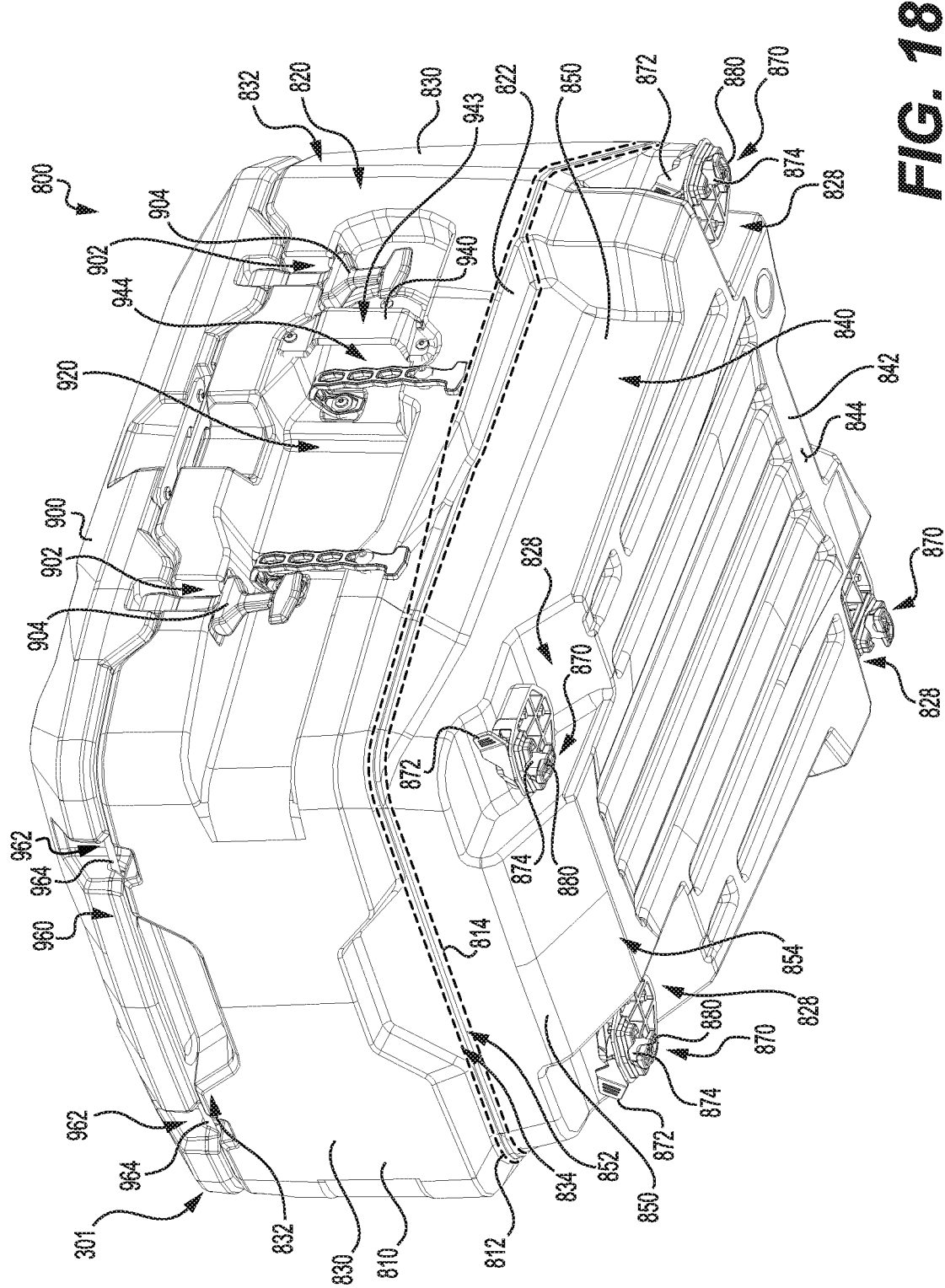
FIG. 18 is a perspective view taken from a bottom, rear, right side of the rear storage box assembly of FIG. 17.
Figure 19:
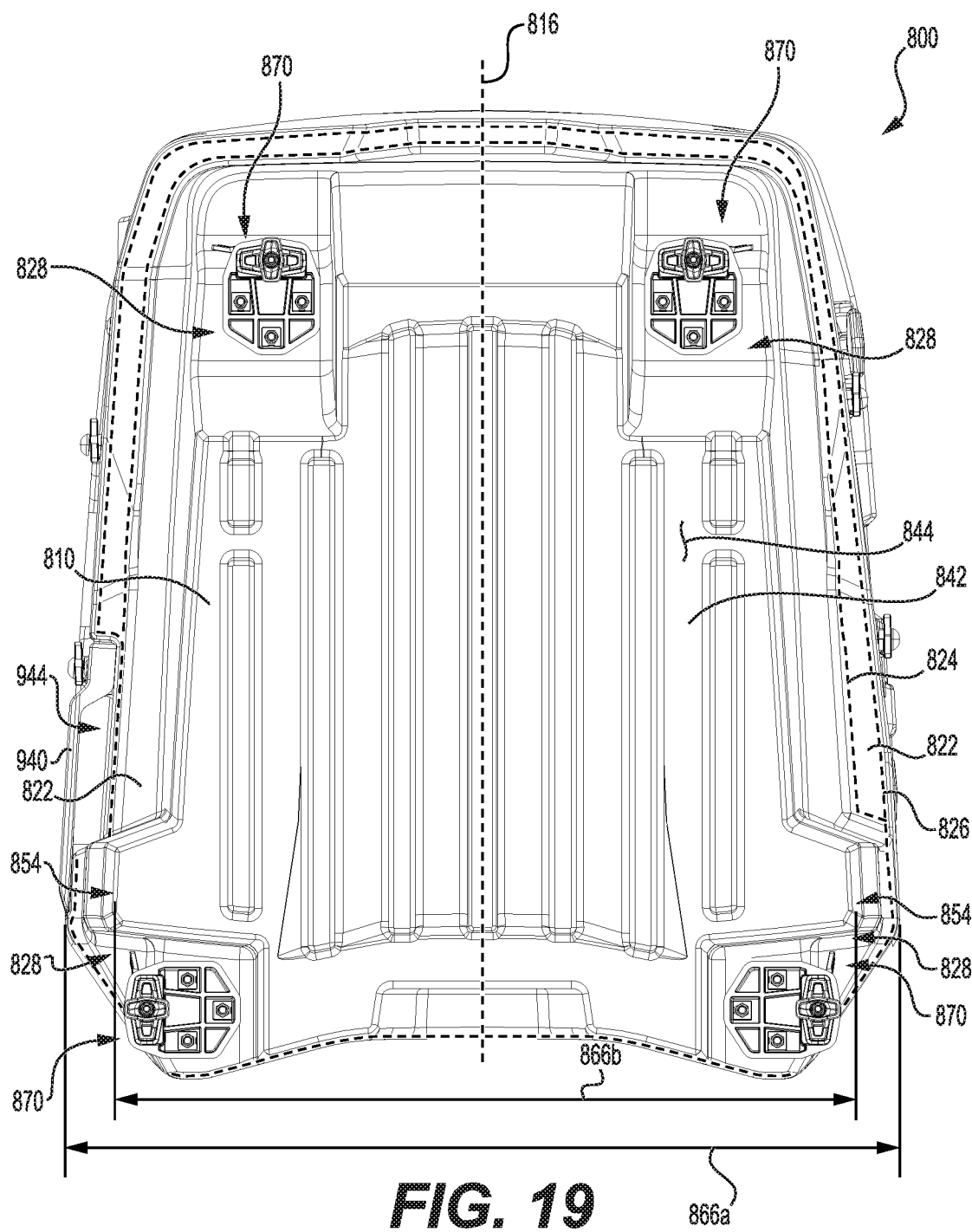
FIG. 19 is a bottom plan view of the rear storage box assembly of FIG. 18.

Referring to FIGS. 18 and 19, the rear storage box assembly 800 includes a box 810 having an upper portion 820 and a lower portion 840. A lid 900 is pivotally connected to the upper portion 820 of the box 810. The upper portion 820 includes a bottom wall 822 having an inner periphery 824 and an outer periphery 826 both shown in dashed lines in FIG. 19. The upper portion also has side walls 830 having an upper end 832 and a lower end 834. Recesses 902 are defined in the upper end 832 of the right side wall 830. The lid 900 is maintained in the closed position (shown in FIGS. 17 to 21) using stretchable rubber straps 904 connected to the lid 900 and received in the recesses 902. The lower end 834 of the side walls 830 defines an outer periphery 812 of the box 810, shown as a dashed line in FIG. 18. The lower portion 840 has a bottom wall 842 and side walls 850. The side walls 850 have an upper end 852 and a lower end 854. The side walls 850 define an outer periphery 814 (FIG. 18) of the box 810 at the upper end 852 of the side walls 850. The outer periphery 814 is disposed within the outer periphery 812.

Still referring to FIGS. 18 and 19, the rear storage box assembly 800 has a front left anchor 870, a rear left anchor 870, a front right anchor 870 and a rear right anchor 870. Each of the anchors 870 includes a lever 872 and a latch 874 connected to the lever 872. As in the front and rear storage box assemblies 100, 400, in the present implementation of the rear storage box assembly 800, the anchors 870 are similar to the anchor described in U.S. Pat. No. 8,875,830 B2 dated Nov. 4, 2014, which is incorporated by reference herein in its entirety. The anchors 870 could be configured otherwise in other implementations of the present technology.

The left anchors 870 and the right anchors 870 are disposed on opposite sides of a longitudinal center plane 816 of the box 810 (FIG. 19). The lower portion 840 of the box 810 defines four recesses 828. The four anchors 870 are disposed within the four recesses 828. It is to be noted that in contrast with the front and rear storage box assemblies 100, 400, the levers 872 of the anchors 870 are accessible from outside the box 810. Referring to FIG. 19 and as in the rear storage box assembly 400, the front and rear, left and right anchors 870 are disposed within the inner periphery 824 and the outer periphery 826 of the bottom wall 822.

Figure 21:
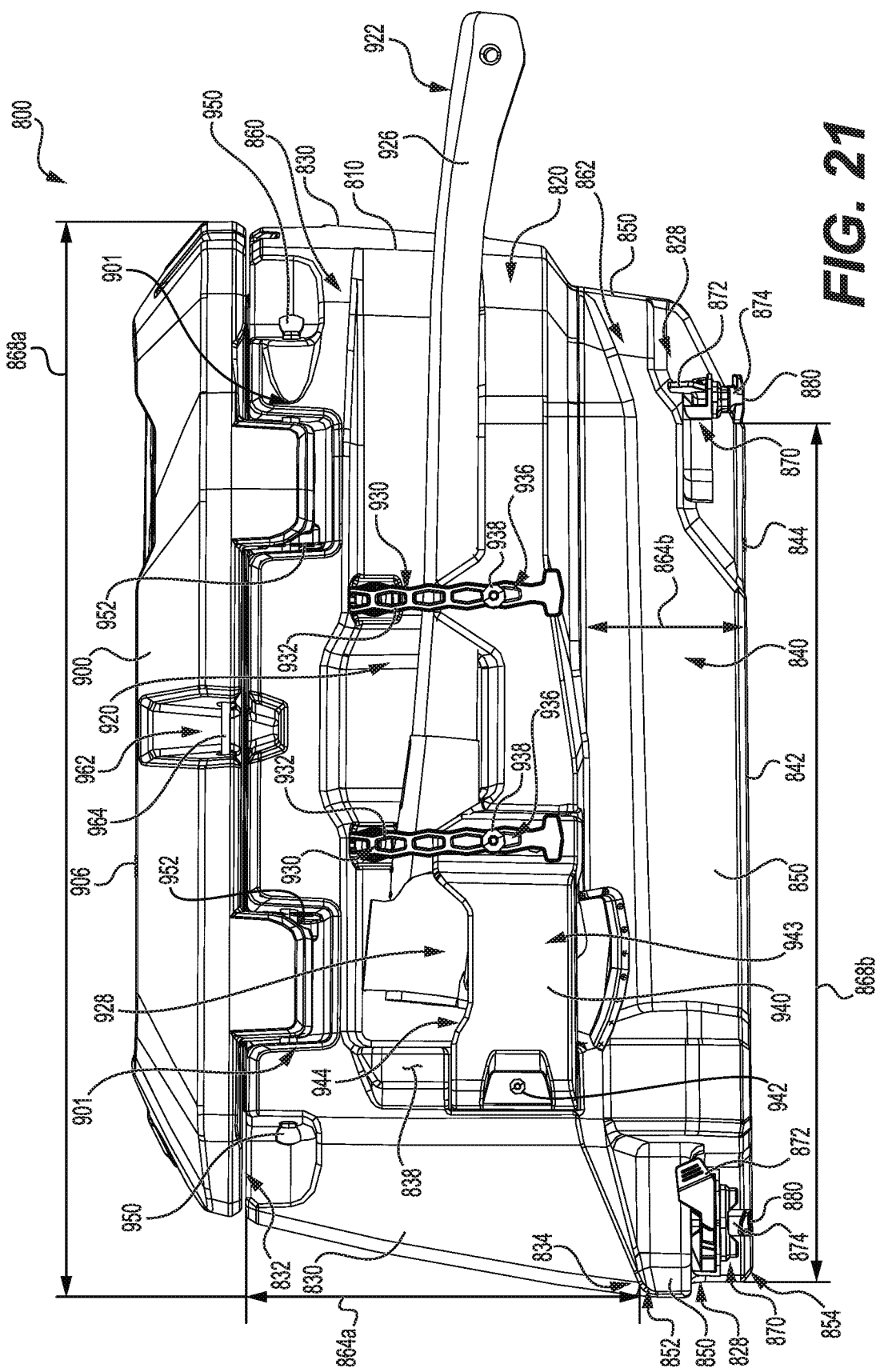
FIG. 21 is a left side elevation view of the rear storage box assembly of FIG. 18.

A bottom surface 880 of each of the four anchors 870 is vertically spaced from a lower surface 844 of the bottom wall 842, as best seen in FIG. 21. As in the rear storage box assembly 400, when the box 810 of the rear storage box assembly 800 lies on a flat surface, the bottom surfaces 880 do not contact the flat surface since the bottom surfaces 880 are vertically spaced from the lower surface 844 of the bottom wall 842, which supports the box 810 on the flat surface. This is best understood with reference FIGS. 18 and 21 in which the lower surface 844 of the bottom wall 842 can be seen extending below the bottom surfaces 880 of the front and rear, left and right anchors 870. This positioning of the bottom surfaces 880 relative to the lower surface 844 of the bottom wall 842 is advantageous in different ways because,
when the box 810 is disposed on a flat surface, the front and rear, left and right anchors 870 do not bear a load caused by the weight of the box 810 and its content. In addition, in situations where the box 810 lies on a muddy or snowy ground surface, the front and rear, left and right latches 874, being received in the recesses 828, are less exposed to mud, snow or debris that could become stuck thereon.

As best seen in FIG. 21, the upper portion 820 has an interior volume 860 that is larger than an interior volume 862 of the lower portion 840. In addition, a maximum height 864b of the side walls 850 is smaller than a maximum height 864a of the side walls 830. Furthermore, like in the front storage box assembly 100 and the rear storage box assembly 400, a maximum length 868a between the upper ends 832 of longitudinally opposite side walls 830 is greater than a maximum length 868b between the lower ends 854 of longitudinally opposite side walls 850. In addition and as best seen in FIG. 19, a maximum width 866a between the upper ends 832 of laterally opposite side walls 830 is greater than a maximum width 866b between the lower ends 854 of laterally opposite side walls 850.

Figure 20:
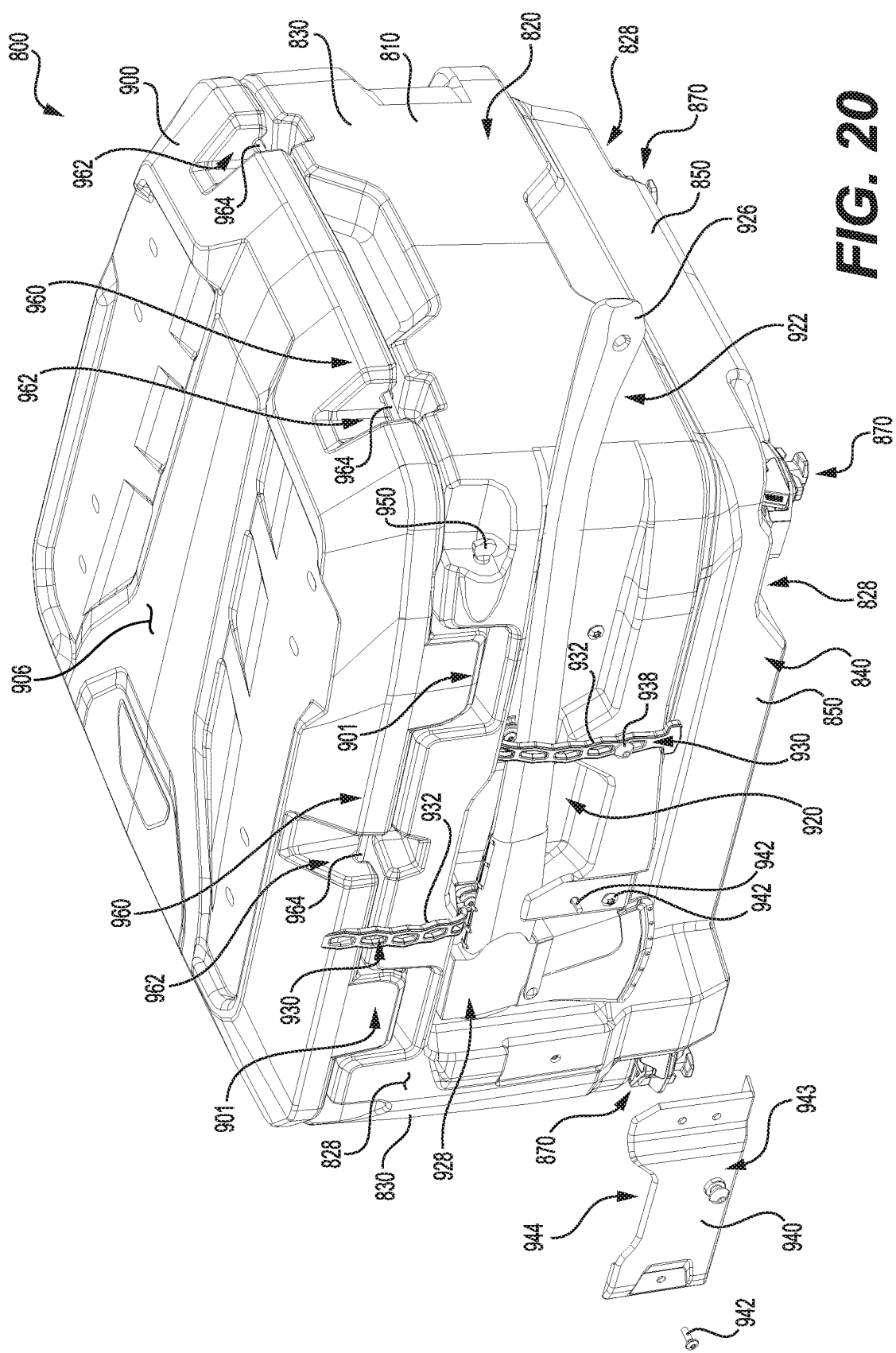
FIG. 20 is a partially exploded, perspective view taken from a top, rear, left side of the rear storage box assembly of FIG. 18, with an accessory received in an accessory holder of the rear storage box assembly.

Referring to FIGS. 18 to 21 and as in the rear storage box assembly 400, outer sides 838 of the left and right side walls 830 define left and right accessory holders 920 for receiving one or more accessories 922. In FIGS. 20 and 21, the accessory 922 is an axe 926, and the axe 926 is received in the left accessory holder 920. The right accessory holder 920 is shaped and structured to receive a hand saw (not shown). It is contemplated that the left and right accessory holder 920 could be shaped and structured for receiving other accessories 922. Two securing devices 930, in the form of stretchable, perforated rubber straps 932 retained by screw heads 938, are connected to the outer sides 938 of the left and right side walls 830 for securing the accessories 922 when received in the left and right accessory holders 920. To secure an accessory 922 in one of the left and right accessory holders 920, a user unfastens one or the two perforated rubber straps 932, positions the accessory 922 against the outer side 838 of the corresponding side wall 830, wraps the stretchable, perforated rubber strap(s) 932 tightly around the accessory 922 until the screw head 938 is engaged in one of the holes 936 of the stretchable, perforated rubber strap 932.

Still referring to FIGS. 18 to 21, left and right panels 940 are removably connected to the outer sides 838 of the left and right side walls 830 using screws 942. The left and right panels 940 cover at least partially the left and right accessory holders 920. A portion 943 of the left and right panels 940 is laterally spaced from the outer side 838 of the corresponding left and right side walls 830. A volume 944 is defined between the portion 943 and the side wall 830. When a portion of the accessory 922 is received in the volume 944, the accessory 922 is further secured in the corresponding left and right accessory holder 920. For example and as best seen in FIGS. 20 and 21, when the left panel 940 is connected to the outer side 838 of the left side wall 830 and when the axe 926 is received in the left accessory holder 920, a head 928 of the axe 926 is at least partially received in the volume 944 extending between the left panel 940 and the outer side 838 of the left side wall 830.

Referring to FIGS. 20 and 21, hinge assemblies 901 connecting the lid 900 to the left side wall 830 of the box 810 include two hinge pins 950. The hinge pins 950 extend through apertures (not shown) defined in the left side wall 830 of the box 810 and in the lid 900. Each of the two hinge pins 950 is retained in place using a cotter pin 952 extending through a hole (not shown) defined in each of the hinge pins 950. When connected via the hinge pins 950, the lid 900 can pivot about the hinge pins 950 between an open position (not shown) and a closed position seen in FIGS. 17 to 21. To disconnect the lid 900 from the box 810, a user first withdraws the two cotter pins 952, and then withdraws the two hinge pins 950 before withdrawing the lid 900 by pulling it upwardly. The user can thus connect and disconnect the lid 900 to and from the box 810 without using any tools.

Referring to FIGS. 18 to 21, the lid 900 of the rear storage box assembly 800 has outer edge portions 960. Several slots 962 are defined in the outer edge portions 960 of the lid 900. More particularly, two slots 962 are defined in the rear outer edge portion 960, one slot 962 is defined in the left outer edge portion 960, and two more slots 962 are defined in the front outer edge portion 960. Rods 964 extend through each one of the slots 962. The rods 964 are connected to the lid 900 and are made of a metallic material. The rods 964 are structured for securing an item to the lid 900. For example, a user may position an item on a top face 906 of the lid 900 and secure the item in place using, for example, a bungee cord (not shown) having hooks thereof engaged to one of the front rod 964 and to one of the rear rod 964. This way, the bungee cord extends across the top face 906 of the lid 900 and secures the item to the lid 900. It is contemplated that a ratchet strap or a rope could also be used to secure an item to the lid 900 when engaged to one or more rods 964 of the lid 900.

Such configuration and structure of the slots 962 and rods 964 of the lid 900 is advantageous in a situation where an item is secured to the lid 900 because should the user need to access the interior volumes 860, 862 of the box 810, the user may open the lid 900 and access the interior volumes 860, 862 of the box 810 without unsecuring the item from the lid 900.

With reference to FIGS. 17 to 21, an illustrative scenario describing the installation and use of the rear storage box assembly 800 with the snowmobile 1000 is provided below. Initially, the rear storage box assembly 800 is separate from the snowmobile 1000. When a user desires to install the rear storage box assembly 800 on the snowmobile 1000, the user first operates the levers 872 of the front and rear, left and right anchors 870 so as to configure them in the unlocked position, if this is not already the case. The user then disposes the rear storage box assembly 800 above the rear receptacle 1098a provided on the snowmobile 1000, as shown in FIG. 17, and lowers the lower portion 840 of the box 810 within the rear receptacle 1098a until (i) the latches 174 are received in the corresponding apertures 1200, and (ii) the bottom wall 822 abuts the rear portion 1021a of the tunnel 1021 forming the rear receptacle 1098a. The box 810 is then supported on the snowmobile 1000 by the lower portion 840 being received in the rear receptacle 1098a. When the user has inserted the latches 874 in the corresponding apertures 1200, the user rotates the levers 872 by about 90 degrees to move the latches 874 from the unlocked position to the locked position (seen in FIGS. 18 and 19), thus preventing the latches 874 from being removed from the apertures 1200. The rear storage box assembly 800 is therefore selectively secured to the snowmobile 1000 and the user can use the rear storage box assembly 800 to carry accessories and cargo in the box 810 while the snowmobile 1000 is being operated. The user can also secure accessories 922 in the left and right accessory holders 920, if needed. The user can also secure an item to the lid 900 using the rods 964 provided in the outer edge portions 960 of the lid 900. When the user desires to remove the rear storage box assembly 800 from the snowmobile 1000, the user rotates the levers 872 by about 90 degrees to move the latches 874 from the locked position to the unlocked position, and withdraws the box 910 from the rear receptacle 1098a by pulling the rear storage box assembly 800 upwardly.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A storage box assembly for a vehicle, comprising:
a box including:
an upper portion having a first bottom wall and first side walls, the first bottom wall having an inner periphery and an outer periphery, the outer periphery surrounding an entirety of the inner periphery, the first side walls having upper and lower ends, the first side walls extending from the outer periphery of the first bottom wall above the first bottom wall
a lower portion having a second bottom wall and second side walls, the second side walls having upper and lower ends, the second side walls extending at least in part from the inner periphery of the first bottom wall below the first bottom wall, and
a first interior volume of the upper portion communicating with a second interior volume of the lower portion;
at least one anchor mounted to the box for selectively securing the storage box assembly to the vehicle, the at least one anchor being disposed within the outer periphery of the first bottom wall, the at least one anchor having a bottom surface being vertically spaced from a lower surface of the second bottom wall and being disposed between the upper end of the first side walls and the second bottom wall; and
a tongue connected to the lower portion of the box, the tongue projecting outwardly of an outer side of the second side walls.

2. The storage box assembly of claim 1, wherein:
the first side walls define a first outer periphery of the box at the lower end of the first side walls;
the second side walls define a second outer periphery of the box at the upper end of the second side walls; and
the second outer periphery is disposed at least in part within the first outer periphery.

3. The storage box assembly of claim 1, wherein the first bottom wall is adapted for abutting a top surface of a receptacle provided on the vehicle for supporting the storage box assembly on the vehicle.

4. The storage box assembly of claim 1, wherein the at least one anchor includes a latch defining the bottom surface of the at least one anchor, and the latch is receivable in an aperture defined in the vehicle.

5. The storage box assembly of claim 1, wherein the at least one anchor is disposed between the inner and outer peripheries of the first bottom wall.

6. The storage box assembly of claim 1, wherein the at least one anchor is a manually-operable anchor.

7. The storage box assembly of claim 1, wherein the at least one anchor is operable from inside the box.

8. The storage box assembly of claim 1, wherein the at least one anchor is a first anchor and a second anchor, and the first and second anchors are disposed on opposite sides of a longitudinal center plane of the box.

9. The storage box assembly of claim 1, wherein a maximum height of the second side walls is greater than a maximum height of the first side walls.

10. The storage box assembly of claim 1, wherein a maximum width between the upper ends of laterally opposite first side walls is greater than a maximum width between the lower ends of laterally opposite second side walls.

11. The storage box assembly of claim 1, wherein a maximum length between the upper ends of longitudinally opposite first side walls is greater than a maximum length between the lower ends of longitudinally opposite second side walls.

12. The storage box assembly of claim 1, wherein the first interior volume of the upper portion is greater than the second interior volume of the lower portion.

13. The storage box assembly of claim 1, wherein the first side walls define an accessory holder on an outer side thereof for receiving an accessory, the accessory holder being accessible from outside the box.

14. The storage box assembly of claim 1, further comprising a lid connected to the upper portion of the box for selectively preventing access to the first and second interior volumes of the upper and lower portions.

15. The storage box assembly of claim 14, wherein the lid is removably connected to the box.

16. The storage box assembly of claim 1, wherein the tongue projects outwardly on an exterior of the inner periphery.

17. The storage box assembly of claim 1, wherein the second side walls are tapered between upper ends of the second side walls and lower ends of the second side walls.

18. A storage box assembly for a vehicle, comprising:
a box including:
  a bottom wall having an outer periphery, the box defining at least one recess in the bottom wall; and
  side walls having upper and lower ends and extending from the outer periphery of the bottom wall above the bottom wall, the at least one recess extending upwardly towards the upper end of the side walls; and
at least one anchor mounted to the box for selectively securing the storage box assembly to the vehicle, the at least one anchor being disposed within the outer periphery of the bottom wall and at least in part within the at least one recess, the at least one anchor having a bottom surface being vertically spaced from a lower surface of the bottom wall.

19. A storage box assembly for a vehicle, comprising:
a box including:
  an upper portion having a first bottom wall and first side walls, the first bottom wall having an inner periphery and an outer periphery, the outer periphery surrounding an entirety of the inner periphery, the first side walls having upper and lower ends, the first side walls extending from the outer periphery of the first bottom wall above the first bottom wall, the upper portion defining at least one recess in the first bottom wall, the at least one recess extending upwardly towards the upper end of the first side walls,
  a lower portion having a second bottom wall and second side walls, the second side walls having upper and lower ends, the second side walls extending at least in part from the inner periphery of the first bottom wall below the first bottom wall, and
  a first interior volume of the upper portion communicating with a second interior volume of the lower portion; and at least one anchor mounted to the box for selectively securing the storage box assembly to the vehicle, the at least one anchor being disposed within the outer periphery of the first bottom wall, the at least one anchor is disposed between the inner and outer peripheries of the first bottom wall, the at least one anchor being disposed at least in part within the at least one recess, the at least one anchor having a bottom surface being vertically spaced from a lower surface of the second bottom wall and being disposed between the upper end of the first side walls and the second bottom wall.

20. A storage box assembly for a vehicle, comprising:
a box including:
  a bottom wall having an outer periphery; and
  side walls having upper and lower ends and extending from the outer periphery of the bottom wall above the bottom wall, the side walls defining an accessory holder on an outer side thereof for receiving an accessory, the accessory holder being accessible from outside the box;
and
at least one anchor mounted to the box for selectively securing the storage box assembly to the vehicle, the at least one anchor being disposed within the outer periphery of the bottom wall, the at least one anchor having a bottom surface being vertically spaced from a lower surface of the bottom wall; and
a panel removably connected to the side walls, the panel covering at least partially the accessory holder for securing the accessory when received in the accessory holder.

21. A storage box assembly for a vehicle, comprising:
a box including:
  an upper portion having a first bottom wall and first side walls, the first bottom wall having an inner periphery and an outer periphery, the outer periphery surrounding an entirety of the inner periphery, the first side walls having upper and lower ends, the first side walls extending from the outer periphery of the first bottom wall above the first bottom wall, the first side walls defining an accessory holder on an outer side thereof for receiving an accessory, the accessory holder being accessible from outside the box,
  a lower portion having a second bottom wall and second side walls, the second side walls having upper and lower ends, the second side walls extending at least in part from the inner periphery of the first bottom wall below the first bottom wall, and
  a first interior volume of the upper portion communicating with a second interior volume of the lower portion;
at least one anchor mounted to the box for selectively securing the storage box assembly to the vehicle, the at least one anchor being disposed within the outer periphery of the first bottom wall, the at least one anchor having a bottom surface being vertically spaced from a lower surface of the second bottom wall and being disposed between the upper end of the first side walls and the second bottom wall; and
at least one securing device connected to the first side walls for selectively securing the accessory when received in the accessory holder.

22. A storage box assembly for a vehicle, comprising:
a box including:
  an upper portion having a first bottom wall and first side walls, the first bottom wall having an inner periphery and an outer periphery, the outer periphery surrounding an entirety of the inner periphery, the first side walls having upper and lower ends, the first side walls extending from the outer periphery of the first bottom wall above the first bottom wall a lower portion having a second bottom wall and second side walls, the second side walls having upper and lower ends, the second side walls extending at least in part from the inner periphery of the first bottom wall below the first bottom wall, and a first interior volume of the upper portion communicating with a second interior volume of the lower portion;

at least one anchor mounted to the box for selectively securing the storage box assembly to the vehicle, the at least one anchor being disposed within the outer periphery of the first bottom wall, the at least one anchor having a bottom surface being vertically spaced from a lower surface of the second bottom wall and being disposed between the upper end of the first side walls and the second bottom wall; and an upper wall extending inward from upper ends of the first side walls, the upper wall defining an opening; and wherein:

the opening is within the outer periphery, and the upper wall is disposed vertically over the at least one anchor.

23. A storage box assembly for a vehicle, comprising:

a box including:

an upper portion having a first bottom wall and first side walls, the first bottom wall having an inner periphery and an outer periphery, the outer periphery surrounding an entirety of the inner periphery, the first side walls having upper and lower ends, the first side walls extending from the outer periphery of the first bottom wall above the first bottom wall, a lower portion having a second bottom wall and second side walls, the second side walls having upper and lower ends, the second side walls extending at least in part from the inner periphery of the first bottom wall below the first bottom wall, and a first interior volume of the upper portion communicating with a second interior volume of the lower portion; and at least one anchor mounted to the box for selectively securing the storage box assembly to the vehicle, the at least one anchor being disposed within the outer periphery of the first bottom wall, the at least one anchor having a bottom surface being vertically spaced from a lower surface of the second bottom wall and being disposed between the upper end of the first side walls and the second bottom wall, wherein the inner periphery surrounds at least three sides of the at least one anchor.

* * * * *

UNITED STATES PATENT AND TRADEMARK OFFICE
CERTIFICATE OF CORRECTION

| | |
|---|---|
| PATENT NO. | : 11,364,852 B2 |
| APPLICATION NO. | : 16/792687 |
| DATED | : June 21, 2022 |
| INVENTOR(S) | : Pierre-Luc Robillard et al. |

It is certified that error appears in the above-identified patent and that said Letters Patent is hereby corrected as shown below:

In the Claims

Column 16, Line 22, Claim 1 should read:
--above the first bottom wall,--.

Signed and Sealed this
Nineteenth Day of December, 2023

Katherine Kelly Vidal
*Director of the United States Patent and Trademark Office*